United States Patent
Pace et al.

(10) Patent No.: US 9,532,069 B2
(45) Date of Patent: *Dec. 27, 2016

(54) VIDEO COMPRESSION REPOSITORY AND MODEL REUSE

(71) Applicant: EUCLID DISCOVERIES, LLC, Concord, MA (US)

(72) Inventors: Charles P. Pace, Manchester, VT (US); Darin DeForest, Phoenix, AZ (US); Nigel Lee, Chestnut Hill, MA (US); Renato Pizzorni, Lima (PE); Richard Wingard, Carlisle, MA (US)

(73) Assignee: Euclid Discoveries, LLC, Concord, MA (US)

( * ) Notice: Subject to any disclaimer, the term of this patent is extended or adjusted under 35 U.S.C. 154(b) by 199 days.

This patent is subject to a terminal disclaimer.

(21) Appl. No.: 14/527,477

(22) Filed: Oct. 29, 2014

(65) Prior Publication Data

US 2015/0124874 A1   May 7, 2015

Related U.S. Application Data

(63) Continuation of application No. 13/772,230, filed on Feb. 20, 2013, now Pat. No. 8,902,971, and a (Continued)

(51) Int. Cl.
*H04N 19/54* (2014.01)
*H04N 19/167* (2014.01)

(52) U.S. Cl.
CPC ............ *H04N 19/54* (2014.11); *H04N 19/167* (2014.11)

(58) Field of Classification Search
USPC ........ 382/232, 243, 305; 375/240.01–240.29
See application file for complete search history.

(56) References Cited

U.S. PATENT DOCUMENTS 5,117,287 A   5/1992   Koike et al.
5,608,458 A   3/1997   Chen et al.
(Continued)

FOREIGN PATENT DOCUMENTS

EP   0 614 318   9/1994
EP   1 124 379   8/2001
(Continued)

OTHER PUBLICATIONS

Bulla, C. et al., "High Quality Video Conferencing: Region of Interest Encoding and Joint Video/Audio Analysis," International Journal on Advances in Telecommunications, 6(3-4): 153-163 (Dec. 2013).

(Continued)

*Primary Examiner* — Ishrat I Sherali
(74) *Attorney, Agent, or Firm* — Hamilton, Brook, Smith & Reynolds, P.C.

(57) ABSTRACT

Systems and methods of improving video encoding/decoding efficiency may be provided. A feature-based processing stream is applied to video data having a series of video frames. Computer-vision-based feature and object detection algorithms identify regions of interest throughout the video datacube. The detected features and objects are modeled with a compact set of parameters, and similar feature/object instances are associated across frames. Associated features/objects are formed into tracks, and each track is given a representative, characteristic feature. Similar characteristic features are clustered and then stored in a model library, for reuse in the compression of other videos. A model-based compression framework makes use of the preserved model data by detecting features in a new video to be encoded, relating those features to specific blocks of data, and accessing similar model information from the model library. The formation of model libraries can be specialized to include (Continued)

personal, "smart" model libraries, differential libraries, and predictive libraries. Predictive model libraries can be modified to handle a variety of demand scenarios.

18 Claims, 17 Drawing Sheets

Related U.S. Application Data continuation-in-part of application No. 13/121,904, filed as application No. PCT/US2009/059653 on Oct. 6, 2009, now Pat. No. 8,942,283, said application No. 13/121,904 is a continuation-in-part of application No. 12/522,322, filed as application No. PCT/US2008/000090 on Jan. 4, 2008, now Pat. No. 8,908,766, said application No. 12/522,322 is a continuation-in-part of application No. 11/396,010, filed on Mar. 31, 2006, now Pat. No. 7,457,472, which is a continuation-in-part of application No. 11/336,366, filed on Jan. 20, 2006, now Pat. No. 7,436,981, which is a continuation-in-part of application No. 11/280,625, filed on Nov. 16, 2005, now Pat. No. 7,457,435, and a continuation-in-part of application No. 11/230,686, filed on Sep. 20, 2005, now Pat. No. 7,426,285, which is a continuation-in-part of application No. 11/191,562, filed on Jul. 28, 2005, now Pat. No. 7,158,680.

(60) Provisional application No. 61/650,363, filed on May 22, 2012, provisional application No. 61/616,334, filed on Mar. 27, 2012, provisional application No. 61/103,362, filed on Oct. 7, 2008, provisional application No. 60/881,966, filed on Jan. 23, 2007, provisional application No. 60/628,819, filed on Nov. 17, 2004, provisional application No. 60/628,861, filed on Nov. 17, 2004, provisional application No. 60/598,085, filed on Jul. 30, 2004, provisional application No. 60/667,532, filed on Mar. 31, 2005, provisional application No. 60/670,951, filed on Apr. 13, 2005.

(56) References Cited

U.S. PATENT DOCUMENTS

| | | | |
|---|---|---|---|
| 5,710,590 | A | 1/1998 | Ichige et al. |
| 5,748,247 | A | 5/1998 | Hu |
| 5,760,846 | A | 6/1998 | Lee |
| 5,774,591 | A | 6/1998 | Black et al. |
| 5,774,595 | A | 6/1998 | Kim |
| 5,826,165 | A | 10/1998 | Echeita et al. |
| 5,917,609 | A | 6/1999 | Breeuwer et al. |
| 5,933,535 | A | 8/1999 | Lee et al. |
| 5,969,755 | A | 10/1999 | Courtney |
| 5,991,447 | A | 11/1999 | Eifrig et al. |
| 6,044,168 | A | 3/2000 | Tucenyan et al. |
| 6,061,400 | A | 5/2000 | Pearlstein et al. |
| 6,069,631 | A | 5/2000 | Tao et al. |
| 6,088,484 | A | 7/2000 | Mead |
| 6,249,318 | B1 | 6/2001 | Girod et al. |
| 6,256,423 | B1 | 7/2001 | Krishnamurthy et al. |
| 6,307,964 | B1 | 10/2001 | Lin et al. |
| 6,381,275 | B1 | 4/2002 | Fukuhara et al. |
| 6,418,166 | B1 | 7/2002 | Wu et al. |
| 6,546,117 | B1 | 4/2003 | Sun et al. |
| 6,574,353 | B1 | 6/2003 | Schoepflin |
| 6,608,935 | B2 | 8/2003 | Nagumo et al. |
| 6,611,628 | B1 | 8/2003 | Sekiguchi et al. |
| 6,614,466 | B2 | 9/2003 | Thomas |
| 6,625,310 | B2 | 9/2003 | Lipton et al. |
| 6,625,316 | B1 | 9/2003 | Maeda |
| 6,640,145 | B2 | 10/2003 | Hoffberg et al. |
| 6,646,578 | B1 | 11/2003 | Au |
| 6,661,004 | B2 | 12/2003 | Aumond et al. |
| 6,664,956 | B1 | 12/2003 | Erdem |
| 6,711,278 | B1 | 3/2004 | Gu et al. |
| 6,731,799 | B1 | 5/2004 | Sun et al. |
| 6,731,813 | B1 | 5/2004 | Stewart |
| 6,738,424 | B1 | 5/2004 | Allmen et al. |
| 6,751,354 | B2 | 6/2004 | Foote et al. |
| 6,774,917 | B1 | 8/2004 | Foote et al. |
| 6,792,154 | B1 | 9/2004 | Stewart |
| 6,870,843 | B1 | 3/2005 | Stewart |
| 6,909,745 | B1 * | 6/2005 | Puri ............ H04N 19/70 348/384.1 |
| 6,912,310 | B1 | 6/2005 | Park et al. |
| 6,925,122 | B2 | 8/2005 | Gorodnichy |
| 6,950,123 | B2 | 9/2005 | Martins |
| 7,003,117 | B2 | 2/2006 | Kacker et al. |
| 7,027,599 | B1 | 4/2006 | Entwistle |
| 7,043,058 | B2 | 5/2006 | Cornog et al. |
| 7,088,845 | B2 | 8/2006 | Gu et al. |
| 7,158,680 | B2 | 1/2007 | Pace |
| 7,162,055 | B2 | 1/2007 | Gu et al. |
| 7,162,081 | B2 | 1/2007 | Timor et al. |
| 7,164,718 | B2 | 1/2007 | Maziere et al. |
| 7,173,925 | B1 | 2/2007 | Dantu et al. |
| 7,184,073 | B2 | 2/2007 | Varadarajan et al. |
| 7,227,893 | B1 | 6/2007 | Srinivasa et al. |
| 7,352,386 | B1 | 4/2008 | Shum et al. |
| 7,356,082 | B1 | 4/2008 | Kuhn |
| 7,415,527 | B2 | 8/2008 | Varadarajan et al. |
| 7,424,157 | B2 | 9/2008 | Pace |
| 7,424,164 | B2 | 9/2008 | Gondek et al. |
| 7,426,285 | B2 | 9/2008 | Pace |
| 7,436,981 | B2 | 10/2008 | Pace |
| 7,457,435 | B2 | 11/2008 | Pace |
| 7,457,472 | B2 | 11/2008 | Pace et al. |
| 7,508,990 | B2 | 3/2009 | Pace |
| 7,574,406 | B2 | 8/2009 | Varadarajan et al. |
| 7,606,305 | B1 | 10/2009 | Rault |
| 7,630,522 | B2 | 12/2009 | Popp et al. |
| 7,715,597 | B2 | 5/2010 | Costache et al. |
| 7,738,550 | B2 | 6/2010 | Kuhn |
| 7,788,191 | B2 | 8/2010 | Jebara |
| 8,019,170 | B2 | 9/2011 | Wang |
| 8,036,464 | B2 | 10/2011 | Sridhar et al. |
| 8,065,302 | B2 | 11/2011 | Sridhar et al. |
| 8,068,677 | B2 | 11/2011 | Varadarajan et al. |
| 8,086,692 | B2 | 12/2011 | Sridhar et al. |
| 8,090,670 | B2 | 1/2012 | Sridhar et al. |
| 8,135,062 | B1 | 3/2012 | Cote |
| 8,140,550 | B2 | 3/2012 | Varadarajan et al. |
| 8,243,118 | B2 | 8/2012 | Pace |
| 8,259,794 | B2 | 9/2012 | Bronstein et al. |
| 8,290,038 | B1 | 10/2012 | Wang et al. |
| 8,737,464 | B1 | 5/2014 | Zhang et al. |
| 8,902,971 | B2 * | 12/2014 | Pace ............ H04N 19/149 375/240.02 |
| 8,908,766 | B2 | 12/2014 | Pace |
| 8,942,283 | B2 * | 1/2015 | Pace ............ G06T 7/2006 375/240.1 |
| 8,964,835 | B2 | 2/2015 | Pace |
| 9,106,977 | B2 * | 8/2015 | Pace ............ H04N 21/23412 |
| 2001/0038714 | A1 | 11/2001 | Masumoto et al. |
| 2002/0016873 | A1 | 2/2002 | Gray et al. |
| 2002/0025001 | A1 | 2/2002 | Ismaeil et al. |
| 2002/0054047 | A1 | 5/2002 | Toyama et al. |
| 2002/0059643 | A1 | 5/2002 | Kitamura et al. |
| 2002/0073109 | A1 | 6/2002 | Toriumi |
| 2002/0085633 | A1 | 7/2002 | Kim et al. |
| 2002/0114392 | A1 | 8/2002 | Sekiguchi et al. |
| 2002/0116529 | A1 | 8/2002 | Hayden |
| 2002/0164068 | A1 | 11/2002 | Yan |
| 2002/0196328 | A1 | 12/2002 | Piotrowski |
| 2003/0011589 | A1 | 1/2003 | Desbrun et al. |
| 2003/0058943 | A1 * | 3/2003 | Zakhor ............ H04N 19/51 375/240.12 |
| 2003/0063778 | A1 | 4/2003 | Rowe et al. |

(56) References Cited

U.S. PATENT DOCUMENTS

| | | |
|---|---|---|
| 2003/0103647 A1 | 6/2003 | Rui et al. |
| 2003/0112243 A1 | 6/2003 | Garg et al. |
| 2003/0122966 A1 | 7/2003 | Markman et al. |
| 2003/0163690 A1 | 8/2003 | Stewart |
| 2003/0169812 A1 | 9/2003 | Maziere et al. |
| 2003/0194134 A1 | 10/2003 | Wenzel et al. |
| 2003/0195977 A1 | 10/2003 | Liu et al. |
| 2003/0206589 A1 | 11/2003 | Jeon |
| 2003/0231769 A1 | 12/2003 | Bolle et al. |
| 2003/0235341 A1 | 12/2003 | Gokturk et al. |
| 2004/0013286 A1 | 1/2004 | Viola et al. |
| 2004/0017852 A1 | 1/2004 | Garrido et al. |
| 2004/0022320 A1 | 2/2004 | Kawada et al. |
| 2004/0028139 A1 | 2/2004 | Zaccarin et al. |
| 2004/0037357 A1 | 2/2004 | Bagni et al. |
| 2004/0081359 A1 | 4/2004 | Bascle et al. |
| 2004/0085315 A1 | 5/2004 | Duan et al. |
| 2004/0107079 A1 | 6/2004 | MacAuslan |
| 2004/0113933 A1 | 6/2004 | Guler |
| 2004/0135788 A1 | 7/2004 | Davidson et al. |
| 2004/0246336 A1 | 12/2004 | Kelly, III et al. |
| 2004/0264574 A1 | 12/2004 | Lainema |
| 2005/0015259 A1 | 1/2005 | Thumpudi et al. |
| 2005/0128306 A1 | 6/2005 | Porter et al. |
| 2005/0185823 A1 | 8/2005 | Brown et al. |
| 2005/0193311 A1 | 9/2005 | Das et al. |
| 2006/0013450 A1 | 1/2006 | Shan et al. |
| 2006/0029253 A1 | 2/2006 | Pace |
| 2006/0045185 A1 | 3/2006 | Kiryati et al. |
| 2006/0067585 A1 | 3/2006 | Pace |
| 2006/0120571 A1 | 6/2006 | Tu et al. |
| 2006/0120613 A1 | 6/2006 | Su et al. |
| 2006/0133681 A1 | 6/2006 | Pace |
| 2006/0177140 A1 | 8/2006 | Pace |
| 2006/0204115 A1 | 9/2006 | Burazerovic |
| 2006/0233448 A1 | 10/2006 | Pace et al. |
| 2006/0274949 A1 | 12/2006 | Gallagher et al. |
| 2007/0025373 A1 | 2/2007 | Stewart |
| 2007/0053513 A1 | 3/2007 | Hoffberg |
| 2007/0071100 A1 | 3/2007 | Shi et al. |
| 2007/0071336 A1 | 3/2007 | Pace |
| 2007/0153025 A1 | 7/2007 | Mitchell et al. |
| 2007/0183661 A1 | 8/2007 | El-Maleh et al. |
| 2007/0185946 A1 | 8/2007 | Basri et al. |
| 2007/0239778 A1 | 10/2007 | Gallagher |
| 2007/0268964 A1 | 11/2007 | Zhao |
| 2007/0297645 A1 | 12/2007 | Pace et al. |
| 2008/0027917 A1 | 1/2008 | Mukherjee et al. |
| 2008/0040375 A1 | 2/2008 | Vo et al. |
| 2008/0043848 A1 | 2/2008 | Kuhn |
| 2008/0101652 A1 | 5/2008 | Zhao et al. |
| 2008/0152008 A1 | 6/2008 | Sun et al. |
| 2008/0232477 A1 | 9/2008 | Wang et al. |
| 2008/0240247 A1 | 10/2008 | Lee et al. |
| 2009/0040367 A1 | 2/2009 | Zakrzewski et al. |
| 2009/0055417 A1 | 2/2009 | Hannuksela |
| 2009/0067719 A1 | 3/2009 | Sridhar et al. |
| 2009/0080855 A1 | 3/2009 | Senftner et al. |
| 2009/0112905 A1 | 4/2009 | Mukerjee et al. |
| 2009/0129474 A1 | 5/2009 | Pandit et al. |
| 2009/0158370 A1 | 6/2009 | Li et al. |
| 2009/0175538 A1 | 7/2009 | Bronstein et al. |
| 2009/0262804 A1 | 10/2009 | Pandit et al. |
| 2009/0292644 A1 | 11/2009 | Varadarajan et al. |
| 2010/0008424 A1 | 1/2010 | Pace |
| 2010/0027861 A1 | 2/2010 | Shekhar et al. |
| 2010/0049739 A1 | 2/2010 | Varadarajan et al. |
| 2010/0073458 A1 | 3/2010 | Pace |
| 2010/0074600 A1 | 3/2010 | Putterman et al. |
| 2010/0086062 A1 | 4/2010 | Pace |
| 2010/0088717 A1 | 4/2010 | Candelore et al. |
| 2010/0135575 A1 | 6/2010 | Guo et al. |
| 2010/0135590 A1 | 6/2010 | Yang et al. |
| 2010/0167709 A1 | 7/2010 | Varadarajan |
| 2010/0272185 A1 | 10/2010 | Gao et al. |
| 2010/0278275 A1 | 11/2010 | Yang et al. |
| 2010/0290524 A1 | 11/2010 | Lu et al. |
| 2010/0316131 A1 | 12/2010 | Shanableh et al. |
| 2010/0322300 A1 | 12/2010 | Li et al. |
| 2010/0322309 A1 | 12/2010 | Huang et al. |
| 2011/0019026 A1 | 1/2011 | Kameyama |
| 2011/0055266 A1 | 3/2011 | Varadarajan et al. |
| 2011/0058609 A1 | 3/2011 | Chaudhury et al. |
| 2011/0087703 A1 | 4/2011 | Varadarajan et al. |
| 2011/0182352 A1 | 7/2011 | Pace |
| 2011/0221865 A1 | 9/2011 | Hyndman |
| 2011/0285708 A1 | 11/2011 | Chen et al. |
| 2011/0286627 A1 | 11/2011 | Takacs et al. |
| 2012/0044226 A1 | 2/2012 | Singh et al. |
| 2012/0079004 A1 | 3/2012 | Herman |
| 2012/0105654 A1 | 5/2012 | Kwatra et al. |
| 2012/0155536 A1 | 6/2012 | Pace |
| 2012/0163446 A1 | 6/2012 | Pace |
| 2012/0281063 A1 | 11/2012 | Pace |
| 2013/0027568 A1 | 1/2013 | Zou et al. |
| 2013/0035979 A1 | 2/2013 | Tenbrock |
| 2013/0083854 A1 | 4/2013 | Pace |
| 2013/0107948 A1 | 5/2013 | DeForest et al. |
| 2013/0114703 A1 | 5/2013 | DeForest et al. |
| 2013/0170541 A1 | 7/2013 | Pace |
| 2013/0230099 A1 | 9/2013 | DeForest et al. |
| 2015/0189318 A1 | 7/2015 | Pace |
| 2015/0256850 A1 | 9/2015 | Kottke |
| 2016/0073111 A1 | 3/2016 | Lee et al. |

FOREIGN PATENT DOCUMENTS

| | | |
|---|---|---|
| EP | 1 250 012 | 10/2002 |
| EP | 1 426 898 | 6/2004 |
| EP | 1 779 294 | 5/2007 |
| JP | 2003-253190 | 11/1991 |
| JP | 5-244585 | 9/1993 |
| JP | 07-038873 | 2/1995 |
| JP | 2007-095587 | 4/1995 |
| JP | 07-288789 | 10/1995 |
| JP | 08-235383 | 9/1996 |
| JP | 08-263623 | 10/1996 |
| JP | 2001-100731 | 4/2001 |
| JP | 2001-103493 | 4/2001 |
| JP | 2002-525735 | 8/2002 |
| JP | 2004-94917 | 3/2004 |
| JP | 2004 356747 | 12/2004 |
| JP | 2006-521048 | 9/2006 |
| TW | 200521885 | 7/2005 |
| TW | 200527327 | 8/2005 |
| TW | 200820782 | 5/2008 |
| WO | WO 98/27515 | 6/1998 |
| WO | WO 98/59497 | 12/1998 |
| WO | WO 99/26415 | 5/1999 |
| WO | WO 00/16563 | 3/2000 |
| WO | WO 00/45600 | 8/2000 |
| WO | WO 02/102084 | 12/2002 |
| WO | WO 03/041396 | 5/2003 |
| WO | WO 2005/055602 | 6/2005 |
| WO | WO 2005/107116 | 11/2005 |
| WO | WO 2006/015092 | 2/2006 |
| WO | WO 2006/034308 | 3/2006 |
| WO | WO 2006/055512 | 5/2006 |
| WO | WO 2006/083567 | 8/2006 |
| WO | WO 2006/105470 | 10/2006 |
| WO | WO 2007/007257 A1 | 1/2007 |
| WO | WO 2007/146102 | 12/2007 |
| WO | WO 2008/091483 | 7/2008 |
| WO | WO 2008/091484 | 7/2008 |
| WO | WO 2008/091485 | 7/2008 |
| WO | WO 2010/042486 | 4/2010 |
| WO | WO 2010/118254 | 10/2010 |
| WO | WO 2011/156250 | 12/2011 |
| WO | WO 2012/033970 | 3/2012 |
| WO | WO 2013/148002 A2 | 10/2013 |
| WO | WO 2013/148091 A1 | 10/2013 |
| WO | WO 2014/051712 A1 | 4/2014 |

(56) References Cited

FOREIGN PATENT DOCUMENTS

| | | |
|---|---|---|
| WO | WO 2015/138008 A1 | 9/2015 |
| WO | WO 2016/040116 A1 | 3/2016 |

OTHER PUBLICATIONS

Chen, Z. et al., "Perception-oriented video coding based on foveated JND model A," Picture Coding Symposium 2009, Section 2 (May 2009).
Li, Z., et al., "Visual attention guided bit allocation in video compression," *Image and Vision Computing*, 29(1): 1-14 (Jan. 2011).
Naccari, M. et al., "Improving HEVC Compression Efficiency by Intensity Dependant Spatial Quantisation," MPEG Meeting (Jul. 2012).
Richardson, Iain E., *The H.264 Advanced Video Compression Standard*, 2nd Edition, Chapter 7: H.264 Transform and Coding, Apr. 20, 2010.
Tang, C-W., "Spatiotemporal Visual Considerations for Video Coding," IEEE Transactions on Multimedia, 9(2): 231-238 (Feb. 2007).
Wikipedia, "Lumi masking," Retrieved from the Internet: https://web.archive.org/web/20061124153834/http://en.wikipedia.org/wiki/Lumi_masking, Retrieved on: Nov. 8, 2006, 1 page.
"Bit-Torrent: Introduction", Retrieved on: Jan. 18, 2006, retrieved online at: http://web.archrve.org/web/20060118042451/http://www.bittorrent.com/introduction.html.
Office Action from U.S. Appl. No. 12/522,322, dated Dec. 11, 2012.
Office Action from U.S. Appl. No. 12/522,357, dated Dec. 12, 2012.
Office Action from U.S. Appl. No. 13/341,437, dated Nov. 20, 2012.
"H.264/MPEG-4 AVC", Wikipedia—The Free Encyclopedia: http://en.wikipedia,org/wiki/X264, 1-17.
"Series H: Audiovisual and Multimedia Systems: Infrastructure of audiovisual services—Coding of moving video; Advanced video coding for generic audiovisual services", ITU-T, H.264: 1-657 (2012).
Amit, Yali, 2D Object Detection and Recognition: Models, Algorithms, and Networks, The MIT Press, Cambridge, Massachusetts, pp. 147-149 (Sections 7.3: Detecting Pose and 7.4: Bibliographical Notes and Discussion) (2002).
Antoszczyszyn, P.M., et al., "Tracking of the Motion of Important Facial Features in Model-Based Coding," Signal Processing, 66(2):249-260, (Apr. 30, 1998).
Bay, H., et al., "SURF: Speeded Up Robust Features", ETH Zurich {bay, vangool}@vision.ee.ethz.ch, 1-14.
Brenneman, A., et al., "x264", Wikipedia—The Free Encyclopedia: http://en.wikipedia,org/wiki/X264, 1-5.
Cho, J-H., et al., "Object detection using multi-resolution mosaic in image sequences," Signal Processing. Image Communication, Elsevier Science Publishers, Amsterdam, vol. 20, No. 3, pp. 233-253, (Mar. 1, 2005).
Dodgson, N. A., "Image resampling," Technical Report, UCAM-CL-TR-261, ISSN 1476-2986, University of Cambridge, Computer Laboratory, (264 pp.) (Aug. 1992).
Doenges, P. K., "MPEG-4: Audio/Video and Synthetic Graphics/Audio for Mixed Media," *Signal Processing: Image Communication*, No. 9, pp. 433-463 (1997).
Ebrahimi, T., et al. "MPEG-4 natural video coding—An Overview", Signal Processing: Image Communication 15:365-385 (2000).
Extended European Search Report for 06 73 3758.4, dated Mar. 8, 2011 (17 pages).
Extended European Search Report for 06 74 0318.8, dated May 6, 2011 (14 pages).
Fischler, M.A., et al., "Random Sample Consensus: A Paradigm for Model Fitting with Applications to Image Analysis and Automated Cartography," Communications of the Association for Computing Machinery, 24(6):381-395 (1981).
Fukuhara, T., et al., "3-D Motion Estimation of Human Head for Model-Based Image Coding," IEEE Proceedings-I, 140(1):26-35, (Feb. 1, 1993).

Garrett-Glaser, J., "Diary of an x264 Developer", http://x264dev.multimedia.cx/, 1-7 (2008).
Gorodinchy, et al., "Seeing faces in video by computers. Editorial for Special Issue on Face Processing in Video Sequences," Image and Vision Computing, Guilford, GB, vol. 24, No. 6, pp. 551-556 (Jun. 1, 2006).
Gunsel, B. et al., "Content based access to video objects: Temporal segmentation, visual summarization, and feature extraction," Signal Processing, vol. 66, pp. 261 280 (1998).
Harris, C., et al., "A Combined Corner and Edge Detector," Alvey Vision Conference, Proceedings of the Alvey Vision Conference, p. 147 (1988).
Huang, R. et al., "Sparse representation of images with hybrid linear models," in Proc. ICIP '04, 2(1281 1284) Oct. 2004.
Huang, T.S. et al., "Chapter 5: Three-Dimensional Model-Based Image Communication," Visual Information Representation, Communication, and Image Processing, Editors: Chen, Chang Wen, et al., Marcel Dekker, Inc., New York, New York, pp. 97-117 (1999).
Intel Integrated Performance Primitives—Documentation, http://software.intel.com/en-us/articles/intel-integrated-performance-primitives-documentation/.
International Search Report for International Application No. PCT/US2009/059653, 8 pp., mailed Feb. 2, 2010.
Invitation to Pay Additional Fees and, Where Applicable, Protest Fee, for International Application No. PCT/US2008/000090, mailed Jun. 2, 2010.
Irani, M., et al., "Detecting and Tracking Multiple Moving Objects Using Temporal Integration," European Conference on Computer Vision, 282-287 (1992).
Jolliffe, T.T., "Principal Component Analysis, Second Edition," Springer, 518 pp., Apr. 2002.
Jones, M. and P. Viola, "Fast Multi View Face Detection," Mitsubishi Electrical Laboratories, Jul. 2003 (10 pp.).
Kass, Michael, Andrew Witzin, and Demetri Terzopoulos, "Snakes: Active contour Models," International Journal of Computer Vision (1988).
Keysers, et al., "Deformation Models for Image Recognition," IEEE Transactions on Pattern Analysis and Machine Intelligence, 29(8):1422-1435 (2007).
Lowe, D.G., "Distinctive Image Features from Scale-Invariant Keypoints", International Journal of Computer Vision, 1-28 (2004).
Miners, B. W., et al., "Dynamic Facial Expression Recognition Using Fuzzy Hidden Markov Models," Systems, Man and Cybernetics, 2005 IEEE International Conference on, IEEE, Piscataway, N.J., USA, vol. 2, pp. 1417-1422 (Oct. 10, 2005).
Neff, et al., "Matching-Pursuit Based Video Compression", Department of Electrical Engineering and Computer Science, MPEG Meeting, Mar. 11, 1995.
Notification and Transmittal of International Search Report and Written Opinion dated Jun. 10, 2013 for PCT/US2013/029297, entitled "Video Compression Repository and Model Reuse".
Notification Concerning Transmittal of International Preliminary Report on Patentability (Chapter I of the Patent Cooperation Treaty), for International Application No. PCT/US2008/00090, mailed Sep. 2, 2010.
Notification Concerning Transmittal of International Preliminary Report on Patentability, in International Application No. PCT/US2008/000092, pp. 9, mailed Aug. 6, 2009.
Notification Concerning Transmittal of International Preliminary Report on Patentability, in International Application No. PCT/US2008/000091, mailed Aug. 6, 2009 (9 pages).
Notification Concerning Transmittal of the International Preliminary Report on Patentability for PCT/US2009/059653, mailed Apr. 21, 2011 (10 pages).
Notification of Transmittal of the International Search Report and the Written Opinion of the International Searching Authority, or the Declaration, for International Application No. PCT/US2008/000090, 19 pp., mailed Aug. 18, 2010.
OpenCV Documentation Page, http://docs.opencv.org/.
Osama, et al., "Video Compression Using Matching Pursuits", IEEE Transactions on Circuits and Systems for Video Technology, vol. 9, No. 1, Feb. 1, 1999.

(56) References Cited

OTHER PUBLICATIONS

Park, et al., "Qualitative Estimation of Camera Motion Parameters From the Linear Composition of Optical Flow," Pattern Recognition: The Journal of the Pattern Recognition Society, 37:767-779 (2004).
Pati, Y.C., et al., "Orthogonal Matching Pursuit: Recursive Function Approximation with Applications to Wavelet Decomposition", 27th Annual Asilomar conference on Signals systems and Computers ,1-5 (1993).
PCT International Search Report, for International Application No. PCT/US2008/000091, dated Sep. 23, 2008, 5 pages.
PCT International Search Report, for International Application No. PCT/US2008/000092, dated Sep. 23, 2008, 5 pages.
Piamsa nga, P. and N. Babaguchi, "Motion estimation and detection of complex object by analyzing resampled movements of parts," in Proc. ICIP '04, 1 (365 368), Oct. 2004.
Pique, R. et al., "Efficient Face Coding in Video Sequences Combining Adaptive Principal Component Analysis and a Hybrid Codec Approach," Proceedings of International Conference on Acoustics, Speech and Signal Processing, 3:629-632(2003).
Rehg, J. M. and Witkin, A. P., "Visual Tracking with Deformation Models," Proc. IEEE Int'l. Conf. on Robotics and Automation, pp. 844-850 (Apr. 1991).
Reinders, M.J.T .et al., "Facial Feature Localization and Adaptation of a Generic Face Model for model-Based Coding," Signal Processing: Image Communication, No. 7, pp. 57-74 (1995).
Richardson, I., "Vcodex White Paper: Video Compression Patents," Vcodex Ltd., pp. 3-6 (2008-2011).
Rong, S. et al., "Efficient spatiotemporal segmentation and video object generation for highway surveillance video," in Proc. IEEE Int'l, Conf. Communications, Circuits and Systems and West Sino Expositions, 1(580 584), Jun. Jul. 2002.
Schröder, K., et al., "Combined Description of Shape and Motion in an Object Based Coding Scheme Using Curved Triangles," Proceedings of the International Conference on Image Processing, 2:390-393 (1995).
Shin, J. et al., "Optical flow-based real-time object tracking using non-prior training active feature model," Academic Press Limited, GB, vol. 11, No. 3, pp. 204-218 (Jun. 1, 2005).
Tabatabai, A. J., et al., "Motion Estimation Methods for Video Compression—A Review," Journal of the Franklin Institute, 335(8): 1411-1441 (1998).
Tao, H.et al., "Compression of MPEG-4 Facial Animation Parameters for Transmission of Talking Heads," IEEE Transactions on Circuits and Systems for Video Technology, vol. 9, No. 2, pp. 264-276 (Mar. 1999).
Toklu, C. et al., "Simultaneous Alpha Map Generation and 2 D Mesh Tracking for Multimedia Applications," Proceedings of the International Conference on Image Processing: 1997, (113 116) (Oct. 1997).
Urban, M., "Harris Interest Operator," Jan. 28, 2003, http://cmp.felk.cvut.cz/cmp/courses/dzo/resources/lecture_harris_urban.pdf (23 pp.).
Vidal, R. and R. Hartley, "Motion segmentation with missing data using PowerFactorization and GPCA," in Proc. CVPR 04, 2 (II-310-316), Jun.-Jul. 2004.
Vidal, R. et al., "Generalized principal component analysis (GPCA)", in Proc. CVPR '03, 1 (I621-628), Jun. 2003.
Viola, P. and Jones, M.J., "Robust Real-Time Face Detection," International Journal of Computer Vision, 20(17):138-153 (2004).
Viola, P. and M. Jones, "Rapid Object Detection using a Boosted Cascade of Simple Features," Proceedings of the 2001 IEEE Computer Society Conference on Computer Vision and Pattern Recognition, 2001, vol. 1, pp. 511-518.
Wang, Y., "Use of Two-Dimensional Deformable Mesh Strucutures for Video Coding, Part II—The Analysis Problem and a Region-Based Coder Employing an Active Mesh Representation" IEEE Transactions on Circuits and Systems for Video Technology, 6(6):1051-8215 (1996).
Wang, Y., "Use of Two-Dimensional Deformable Mesh Structures for Video Coding, Part I—The Synthesis Problem: Mesh-Based Function Approximation and Mapping" IEEE Transactions on Circuits and Systems for Video Technology, 6(6):1051-8215 (1996).
Wiegand, T., et al., "Overview of the H.264/AVC Video Coding Standard", IEEE Transactions on Circuits and Systems for Video Technology, 13(7):560-576 (2003).
Written Opinion of the International Searching Authority for International Application No. PCT/US2009/059653, 8 pp., mailed Feb. 2, 2010.
Zhang, et al., "A Novel Video Coding Framework by Perceptual Representation and Macroblock-Based Matching Pursuit Algorithm", Department of Computer Science and Technology pp. 322-221, Jan. 9, 2007.
Notification Concerning Transmittal of International Preliminary Report on Patentability, PCT/US2013/029297, "Video Compression Repository and Model Reuse," date of mailing Oct. 1, 2014.
Notification Concerning Transmittal of International Preliminary Report on Patentability, PCT/US2013/025123, "Context Based Video Encoding and Decoding," date of mailing Oct. 9, 2014.
Notice of Allowance, U.S. Appl. No. 13/772,230, dated Sep. 23, 2014.
Notice of Allowance, U.S. Appl. No. 13/121,904, dated Jul. 25, 2014.
Office Action from U.S. Appl. No. 13/121,904, dated May 29, 2013.
Braspenning, R., De Haan, G., "True Motion Estimation Using Features Correspondence," Electronic Imaging, (2004).
Chen, M.J., et al., "Efficient multi-frame motion estimation algorithms for MPEG-4 AVC/JVT/H.264," 2004 IEEE International Symposium on Circuits and Sytems, 111-737 (2004).
Lee, T.K., et al., "A New Motion Vector Composition Algorithm for H.264 Multiple Reference Frame Motion Estimation," Retrieved from the internet URL:http://eprints.lib.hokudai.ac.jp/dspace/bitstream/2115/39749/1/TA-P2-7.pdf [retrieved on Jan. 16, 2015].
Smith, L., et al., "A tutorial on Principal Components Analysis," Feb. 26, 2002.
Su., Yeping, et al., "Fast multiple reference frame motion estimation for H.264/AVC," IEEE Transactions on Circuits and Systems for Video Technology, 16(3): 447-452 (2006).
Wikipedia, Motion Perception; 6 pages; downloaded on Aug. 24, 2015; See https://en.wikipedia.org/wiki/Motion_perception#The_aperture_problem.

* cited by examiner

VIDEO COMPRESSION REPOSITORY AND MODEL REUSE

RELATED APPLICATION(S)

This application is a continuation of U.S. application Ser. No. 13/772,230, filed Feb. 20, 2013, which claims the benefit of U.S. Provisional Application No. 61/650,363, filed on May 22, 2012 and 61/616,334, filed Mar. 27, 2012, and is a continuation-in part of U.S. patent application Ser. No. 13/121,904, filed Mar. 30, 2011, which is the U.S. National stage of International Patent Application No. PCT/US2009/059653 filed Oct. 6, 2009 which designates the U.S. and is published in English, and which claims the benefit of U.S. Provisional Application No. 61/103,362, filed Oct. 7, 2008. The application Ser. No. 13/121,904 is also a continuation-in part of U.S. patent application Ser. No. 12/522,322, filed Jul. 7, 2009, which is the U.S. National stage of International Patent Application No. PCT/US2008/000090 filed Jan. 4, 2008 designating the U.S. and published in English, which claims the benefit of U.S. Provisional Application No. 60/881,966, filed Jan. 23, 2007, and which is related to U.S. Provisional Application No. 60/811,890, filed Jun. 8, 2006, and is a continuation-in-part of U.S. application Ser. No. 11/396,010, filed Mar. 31, 2006, now U.S. Pat. No. 7,457,472, issued Nov. 25, 2008, which is a continuation-in-part of U.S. application Ser. No. 11/336,366 filed Jan. 20, 2006, now U.S. Pat. No. 7,436,981, issued Oct. 14, 2008, which is a continuation-in-part of U.S. application Ser. No. 11/280,625, filed Nov. 16, 2005, now U.S. Pat. No. 7,457,435, Nov. 25, 2008, which claims the benefit of U.S. Provisional Application No. 60/628,819, filed Nov. 17, 2004 and 60/628,861, filed Nov. 17, 2004, and which is a continuation-in-part of U.S. application Ser. No. 11/230,686, filed Sep. 20, 2005, now U.S. Pat. No. 7,426,285, issued Sep. 16, 2008, which is a continuation-in-part of U.S. application Ser. No. 11/191,562 filed Jul. 28, 2005, now U.S. Pat. No. 7,158,680, issued Jan. 2, 2007, claiming benefit of U.S. Provisional Application No. 60/598,085, filed Jul. 30, 2004. U.S. application Ser. No. 11/396,010 also claims priority to U.S. Provisional Application No. 60/667,532, filed Mar. 31, 2005 and U.S. Provisional Application No. 60/670,951, filed Apr. 13, 2005.

This application is also related to U.S. patent application Ser. No. 13/725,940, filed on Dec. 21, 2012 which claims the benefit of U.S. Provisional Application No. 61/707,650 filed on Sep. 28, 2012 and 61/615,795 filed on Mar. 26, 2012.

The entire teachings of the above applications are incorporated herein by reference.

BACKGROUND

Video compression can be considered the process of representing digital video data in a form that uses fewer bits when stored or transmitted. Video compression algorithms can achieve compression by exploiting redundancies and irrelevancies in the video data, whether spatial, temporal, or color-space. Video compression algorithms typically segment the video data into portions, such as groups of frames and groups of pels, to identify areas of redundancy within the video that can be represented with fewer bits than the original video data. When these redundancies in the data are reduced, greater compression can be achieved. An encoder can be used to transform the video data into an encoded format, while a decoder can be used to transform encoded video back into a form comparable to the original video data. The implementation of the encoder/decoder is referred to as a codec.

Standard encoders divide a given video frame into non-overlapping coding units or macroblocks (rectangular regions of contiguous pels) for encoding. The macroblocks are typically processed in a traversal order of left to right and top to bottom in the frame. Compression can be achieved when macroblocks are predicted and encoded using previously-coded data. The process of encoding macroblocks using spatially neighboring samples of previously-coded macroblocks within the same frame is referred to as intra-prediction. Intra-prediction attempts to exploit spatial redundancies in the data. The encoding of macroblocks using similar regions from previously-coded frames, together with a motion estimation model, is referred to as inter-prediction. Inter-prediction attempts to exploit temporal redundancies in the data.

The encoder may generate a residual by measuring the difference between the data to be encoded and the prediction. The residual can provide the difference between a predicted macroblock and the original macroblock. The encoder can generate motion vector information that specifies, for example, the location of a macroblock in a reference frame relative to a macroblock that is being encoded or decoded. The predictions, motion vectors (for inter-prediction), residuals, and related data can be combined with other processes such as a spatial transform, a quantizer, an entropy encoder, and a loop filter to create an efficient encoding of the video data. The residual that has been quantized and transformed can be processed and added back to the prediction, assembled into a decoded frame, and stored in a framestore. Details of such encoding techniques for video will be familiar to a person skilled in the art.

H.264/MPEG-4 Part 10 AVC (advanced video coding), hereafter referred to as H.264, is a codec standard for video compression that utilizes block-based motion estimation and compensation and achieves high quality video representation at relatively low bitrates. This standard is one of the encoding options used for Blu-ray disc creation and within major video distribution channels, including video streaming on the internet, video conferencing, cable television, and direct-broadcast satellite television. The basic coding units for H.264 are 16×16 macroblocks. H.264 is the most recent widely-accepted standard in video compression.

The basic MPEG standard defines three types of frames (or pictures), based on how the macroblocks in the frame are encoded. An I-frame (intra-coded picture) is encoded using only data present in the frame itself. Generally, when the encoder receives video signal data, the encoder creates I frames first and segments the video frame data into macroblocks that are each encoded using intra-prediction. Thus, an I-frame consists of only intra-predicted macroblocks (or "intra macroblocks"). I-frames can be costly to encode, as the encoding is done without the benefit of information from previously-decoded frames. A P-frame (predicted picture) is encoded via forward prediction, using data from previously-decoded I-frames or P-frames, also known as reference frames. P-frames can contain either intra macroblocks or (forward-) predicted macroblocks. A B-frame (bi-predictive picture) is encoded via bidirectional prediction, using data from both previous and subsequent frames. B-frames can contain intra, (forward-)predicted, or bi-predicted macroblocks.

As noted above, conventional inter-prediction is based on block-based motion estimation and compensation (BBMEC). The BBMEC process searches for the best match between the target macroblock (the current macroblock being encoded) and similar-sized regions within previously-decoded reference frames. When a best match is found, the encoder may transmit a motion vector. The motion vector may include a pointer to the best match's frame position as well as information regarding the difference between the best match and the corresponding target macroblock. One could conceivably perform exhaustive searches in this manner throughout the video "datacube" (height×width×frame) to find the best possible matches for each macroblock, but exhaustive search is usually computationally prohibitive. As a result, the BBMEC search process is limited, both temporally in terms of reference frames searched and spatially in terms of neighboring regions searched. This means that "best possible" matches are not always found, especially with rapidly changing data.

A particular set of reference frames is termed a Group of Pictures (GOP). The GOP contains only the decoded pels within each reference frame and does not include information as to how the macroblocks or frames themselves were originally encoded (I-frame, B-frame or P-frame). Older video compression standards, such as MPEG-2, used one reference frame (the previous frame) to predict P-frames and two reference frames (one past, one future) to predict B-frames. The H.264 standard, by contrast, allows the use of multiple reference frames for P-frame and B-frame prediction. While the reference frames are typically temporally adjacent to the current frame, there is also accommodation for the specification of reference frames from outside the set of temporally adjacent frames.

Conventional compression allows for the blending of multiple matches from multiple frames to predict regions of the current frame. The blending is often linear, or a log-scaled linear combination of the matches. One example of when this bi-prediction method is effective is when there is a fade from one image to another over time. The process of fading is a linear blending of two images, and the process can sometimes be effectively modeled using bi-prediction. Some past standard encoders such as the MPEG-2 interpolative mode allow for the interpolation of linear parameters to synthesize the bi-prediction model over many frames.

The H.264 standard also introduces additional encoding flexibility by dividing frames into spatially distinct regions of one or more contiguous macroblocks called slices. Each slice in a frame is encoded (and can thus be decoded) independently from other slices. I-slices, P-slices, and B-slices are then defined in a manner analogous to the frame types described above, and a frame can consist of multiple slice types. Additionally, there is typically flexibility in how the encoder orders the processed slices, so a decoder can process slices in an arbitrary order as they arrive to the decoder.

Historically, model-based compression schemes have been proposed to avoid the limitations of BBMEC prediction. These model-based compression schemes (the most well-known of which is perhaps the MPEG-4 Part 7 standard) rely on the detection and tracking of objects or features in the video and a method for encoding those features/objects separately from the rest of the video frame. These model-based compression schemes, however, suffer from the challenge of segmenting video frames into object vs. non-object (feature vs. non-feature) regions. First, because objects can be of arbitrary size, their shapes need to be encoded in addition to their texture (color content). Second, the tracking of multiple moving objects can be difficult, and inaccurate tracking causes incorrect segmentation, usually resulting in poor compression performance. A third challenge is that not all videos are composed of objects or features, so there needs to be a fallback encoding scheme when objects/features are not present.

While the H.264 standard allows a codec to provide better quality video at lower file sizes than previous standards, such as MPEG-2 and MPEG-4 ASP (advanced simple profile), "conventional" compression codecs implementing the H.264 standard typically have struggled to keep up with the demand for greater video quality and resolution on memory-constrained devices, such as smartphones and other mobile devices, operating on limited-bandwidth networks. Video quality and resolution are often compromised to achieve adequate playback on these devices. Further, as video resolution increases, file sizes increase, making storage of videos on and off these devices a potential concern.

SUMMARY

Co-pending U.S. application Ser. No. 13/725,940 by Applicant (herein "the '940 application") presents a model-based compression scheme that avoids the segmentation problem noted above. While the model-based compression framework (MBCF) of Applicant's co-pending '940 application also detects and tracks objects/features to identify important regions of the video frame to encode, it does not attempt to encode those objects/features explicitly. Rather, the objects/features are related to nearby macroblocks, and it is the macroblocks that are encoded, as in "conventional" codecs. This implicit use of modeling information mitigates the segmentation problem in two ways: it keeps the sizes of the coding units (macroblocks) fixed (thus avoiding the need to encode object/feature shapes), and it lessens the impact of inaccurate tracking (since the tracking aids but does not dictate the motion estimation step). Additionally, the MBCF of the co-pending '940 application applies modeling to video data at multiple fidelities, including a fallback option to conventional compression when objects/features are not present; this hybrid encoding scheme ensures that modeling information will only be used where needed and not incorrectly applied where it is not needed.

U.S. Pat. No. 6,088,484 to Mead proposed an extension of the standard model-based compression schemes where objects detected in one video could be stored and then reused to aid compression of similar objects in another video. However, the model-reuse compression scheme of this Mead patent involves explicit or direct encoding of objects/features in the new video and thus is faced with the same segmentation problems noted above (i.e., the challenge of accurately segmenting objects/features from non-objects/non-features). The present invention proposes a model-reuse compression scheme within the framework of the co-pending '940 application, whose implicit use of object/feature models to indicate important macroblocks to encode avoids the segmentation problem while retaining most of the benefits of modeling to improve encoder prediction.

The present invention recognizes fundamental limitations in the inter-prediction process of conventional video codecs and applies higher-level modeling to overcome those limitations and provide improved inter-prediction, while maintaining the same general processing flow and framework as conventional encoders.

The present invention builds on the model-based compression approach presented in the co-pending '940 application, where features are detected, modeled, and tracked within a video, and the feature information is used to improve prediction and encoding of later data within the same video. This "online" feature-based prediction of the '940 application, where feature information is generated and used to help encode video segments later in the same video, is extended in the present invention to "offline" feature-based prediction, where feature information from one video is persisted or saved into a model library, to be reused to identify target macroblocks and thus help encode data from another video. This is accomplished in a manner free of feature segmentation in the target video. While standard compression techniques as well as the online prediction in the '940 application attempt to exploit temporal redundancies within a single video, the offline prediction presented by the present invention attempts to exploit redundancies across multiple videos.

The four major components of an offline feature-based compression scheme of the present invention are: (i) generating the feature models and associated information from an input video or videos and saving the feature information; (ii) reusing the saved feature information to improve compression of another video (different from or unrelated to the input videos) in a manner avoiding feature segmentation in that video; (iii) forming a feature model library out of the feature information from a large set of input videos; and (iv) using the feature model library in decoding the unrelated or target videos. The formation of model libraries can be specialized to include personal, "smart" model libraries, differential libraries, and predictive libraries. Predictive model libraries can be modified to handle a variety of demand scenarios.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION

The teachings of all patents, published applications and references cited herein are incorporated by reference in their entirety. A description of example embodiments of the invention follows.

The invention can be applied to various standard encodings and coding units. In the following, unless otherwise noted, the terms "conventional" and "standard" (sometimes used together with "compression," "codecs," "encodings," or "encoders") will refer to H.264, and "macroblocks" will be referred to without loss of generality as the basic H.264 coding unit.

Generating and Saving Feature Models

Definition of Features

Example elements of the invention may include video compression and decompression processes that can optimally represent digital video data when stored or transmitted. The processes may include or interface with a video compression/encoding algorithm(s) to exploit redundancies and irrelevancies in the video data, whether spatial, temporal, or spectral. This exploitation may be done through the use and retention of feature-based models/parameters. Moving forward, the terms "feature" and "object" are used interchangeably. Objects can be defined, without loss of generality, as "large features." Both features and objects can be used to model the data.

Features are groups of pels in close proximity that exhibit data complexity. Data complexity can be detected via various criteria, as detailed below, but the ultimate characteristic of data complexity from a compression standpoint is "costly encoding," an indication that an encoding of the pels by conventional video compression exceeds a threshold that would be considered "efficient encoding." When conventional encoders allocate a disproportionate amount of bandwidth to certain regions (because conventional inter-frame search cannot find good matches for them within conventional reference frames), it becomes more likely that the region is "feature-rich" and that a feature model-based compression method will improve compression significantly in those regions.

Feature Detection

Figure 1:
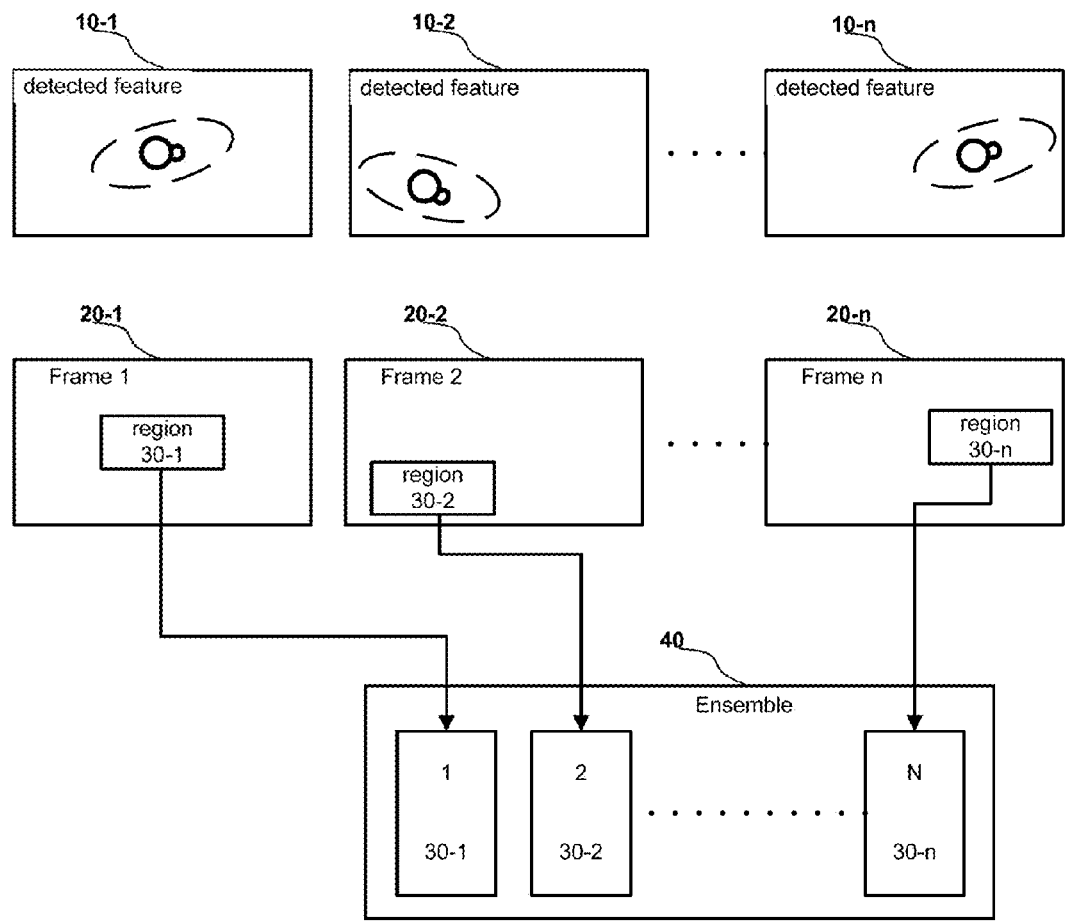
FIG. 1 is a block diagram depicting feature modeling according to an embodiment of the invention.

FIG. 1 depicts a feature whose instances 10-1, 10-2, . . . , 10-$n$ have been detected in one or more frames of the video 20-1, 20-2, . . . , 20-$n$. Typically, such a feature can be detected using several criteria based on both structural information derived from the pels and complexity criteria indicating that conventional compression utilizes a disproportionate amount of bandwidth to encode the feature region. Each feature instance can be further identified spatially in its frame 20-1, 20-2, . . . , 20-$n$ by a corresponding spatial extent or perimeter, shown in FIG. 1 as "regions" 30-1, 30-2, . . . , 30-$n$. These feature regions 30-1, 30-2, . . . , 30-$n$ can be extracted, for instance, as simple rectangular regions of pel data. In one embodiment of the current invention, the feature regions are of size 16×16, the same size as H.264 macroblocks.

Many algorithms have been proposed in the literature for detecting features based on the structure of the pels themselves, including a class of nonparametric feature detection algorithms that are robust to different transformations of the pel data. For example, the scale invariant feature transform (SIFT) [Lowe, David, 2004, "Distinctive image features from scale-invariant keypoints," Int. J. of Computer Vision, 60(2):91-110] uses a convolution of a difference-of-Gaussian function with the image to detect blob-like features. The speeded-up robust features (SURF) algorithm [Bay, Herbert et al., 2008, "SURF: Speeded up robust features," Computer Vision and Image Understanding, 110(3):346-359] uses the determinant of the Hessian operator, also to detect blob-like features. In one embodiment of the present invention, the SURF algorithm is used to detect features.

Other feature detection algorithms are designed to find specific types of features, such as faces. In another embodiment of the present invention, the Haar-like features are detected as part of frontal and profile face detectors [Viola, Paul and Jones, Michael, 2001, "Rapid object detection using a boosted cascade of simple features," Proc. of the 2001 IEEE Conf. on Computer Vision and Pattern Recognition, 1:511-518].

In another embodiment, discussed in Applicant's co-pending U.S. application Ser. No. 13/121,904, filed Oct. 6, 2009, which is incorporated herein by reference in its entirety, features can be detected based on encoding complexity (bandwidth) encountered by a conventional encoder. Encoding complexity, for example, can be determined through analysis of the bandwidth (number of bits) required by conventional compression (e.g., H.264) to encode the regions in which features appear. Restated, different detection algorithms operate differently, but each are applied to the entire video sequence of frames over the entire video data in embodiments. For a non-limiting example, a first encoding pass with an H.264 encoder is made and creates a "bandwidth map." This in turn defines or otherwise determines where in each frame H.264 encoding costs are the highest.

Typically, conventional encoders such as H.264 partition video frames into uniform tiles (for example, 16×16 macroblocks and their subtiles) arranged in a non-overlapping pattern. In one embodiment, each tile can be analyzed as a potential feature, based on the relative bandwidth required by H.264 to encode the tile. For example, the bandwidth required to encode a tile via H.264 may be compared to a fixed threshold, and the tile can be declared a "feature" if the bandwidth exceeds the threshold. The threshold may be a preset value. The preset value may be stored in a database for easy access during feature detection. The threshold may be a value set as the average bandwidth amount allocated for previously encoded features. Likewise, the threshold may be a value set as the median bandwidth amount allocated for previously encoded features. Alternatively, one could calculate cumulative distribution functions of the tile bandwidths across an entire frame (or an entire video) and declare as "features" any tile whose bandwidth is in the top percentiles of all tile bandwidths.

In another embodiment, video frames can be partitioned into overlapping tiles. The overlapping sampling may be offset so that the centers of the overlapping tiles occur at the intersection of every four underlying tiles' corners. This over-complete partitioning is meant to increase the likelihood that an initial sampling position will yield a detected feature. Other, possibly more complex, topological partitioning methods are also possible.

Small spatial regions detected as features can be analyzed to determine if they can be combined based on some coherency criteria into larger spatial regions. Spatial regions can vary in size from small groups of pels to larger areas that may correspond to actual objects or parts of objects. However, it is important to note that the detected features need not correspond to unique and separable entities such as objects and sub-objects. A single feature may contain elements of two or more objects or no object elements at all. For the current invention, the critical characteristic of a feature is that the set of pels comprising the feature can be efficiently compressed, relative to conventional methods, by feature model-based compression techniques.

Coherency criteria for combining small regions into larger regions may include: similarity of motion, similarity of appearance after motion compensation, and similarity of encoding complexity. Coherent motion may be discovered through higher-order motion models. In one embodiment, the translational motion for each individual small region can be integrated into an affine motion model that is able to approximate the motion model for each of the small regions. If the motion for a set of small regions can be integrated into aggregate models on a consistent basis, this implies a dependency among the regions that may indicate a coherency among the small regions that could be exploited through an aggregate feature model.

Feature Model Formation

After feature(s) have been detected in multiple frames of a video, it is important that multiple instances of the same feature be related together. This process is known as feature association and is the basis for feature tracking (determining the location of a particular feature over time), described below. To be effective, however, the feature association process must first define a feature model that can be used to discriminate similar feature instances from dissimilar ones.

In one embodiment, the feature pels themselves can be used to model a feature. Feature pel regions, which are two-dimensional, can be vectorized and similar features can be identified by minimizing mean-squared error (MSE) or maximizing inner products between different feature pel vectors. The problem with this is that feature pel vectors are sensitive to small changes in the feature, such as translation, rotation, scaling, and changing illumination of the feature. Features often change in these ways throughout a video, so using the feature pel vectors themselves to model and associate features requires some accounting for these changes. In one embodiment, the invention accounts for such feature changes in the simplest way, by applying standard motion estimation and compensation algorithms found in conventional codecs (e.g., H.264), which account for translational motion of features. In other embodiments, more complex techniques can be used to account for rotations, scalings, and illumination changes of features from frame to frame.

In an alternate embodiment, feature models are compact representations of the features themselves ("compact" meaning "of lower dimension than the original feature pels vectors") that are invariant (remain unchanged when transformations of a certain type are applied) to small rotations, translations, scalings, and possibly illumination changes of the feature—meaning that if the feature changes slightly from frame to frame, the feature model will remain relatively constant. A compact feature model of this type is often termed a "descriptor." In one embodiment of the current invention, for example, the SURF feature descriptor has length 64 (compared to the length-256 feature pel vectors) and is based on sums of Haar wavelet transform responses. In another embodiment, a color histogram with 5 bins is constructed from a colormap of the feature pels, and this 5-component histogram acts as the feature descriptor. In an alternate embodiment, feature regions are transformed via a 2-D discrete cosine transform (DCT). The 2-D DCT coefficients are then summed over the upper triangular and lower triangular portions of the coefficient matrix. These sums then comprise an edge feature space and act as the feature descriptor.

When feature descriptors are used to model features, similar features can be identified by minimizing MSE or maximizing inner products between the feature descriptors (instead of between the feature pel vectors).

Feature Association and Tracking

Once features have been detected and modeled, the next step is to associate similar features over multiple frames. Each instance of a feature that appears in multiple frames is a sample of the appearance of that feature, and multiple feature instances that are associated across frames are considered to "belong" to the same feature. Once associated, multiple feature instances belonging to the same feature may either be aggregated to form a feature track or gathered into an ensemble matrix 40 (FIG. 1).

A feature track is defined as the (x,y) location of a feature as a function of frames in the video. One embodiment associates newly detected feature instances with previously tracked features (or, in the case of the first frame of the video, with previously detected features) as the basis for determining which features instances in the current frame are extensions of which previously-established feature tracks. The identification of a feature's instance in the current frame with a previously established feature track (or, in the case of the first video frame, with a previously detected feature) constitutes the tracking of the feature.

Figure 2:
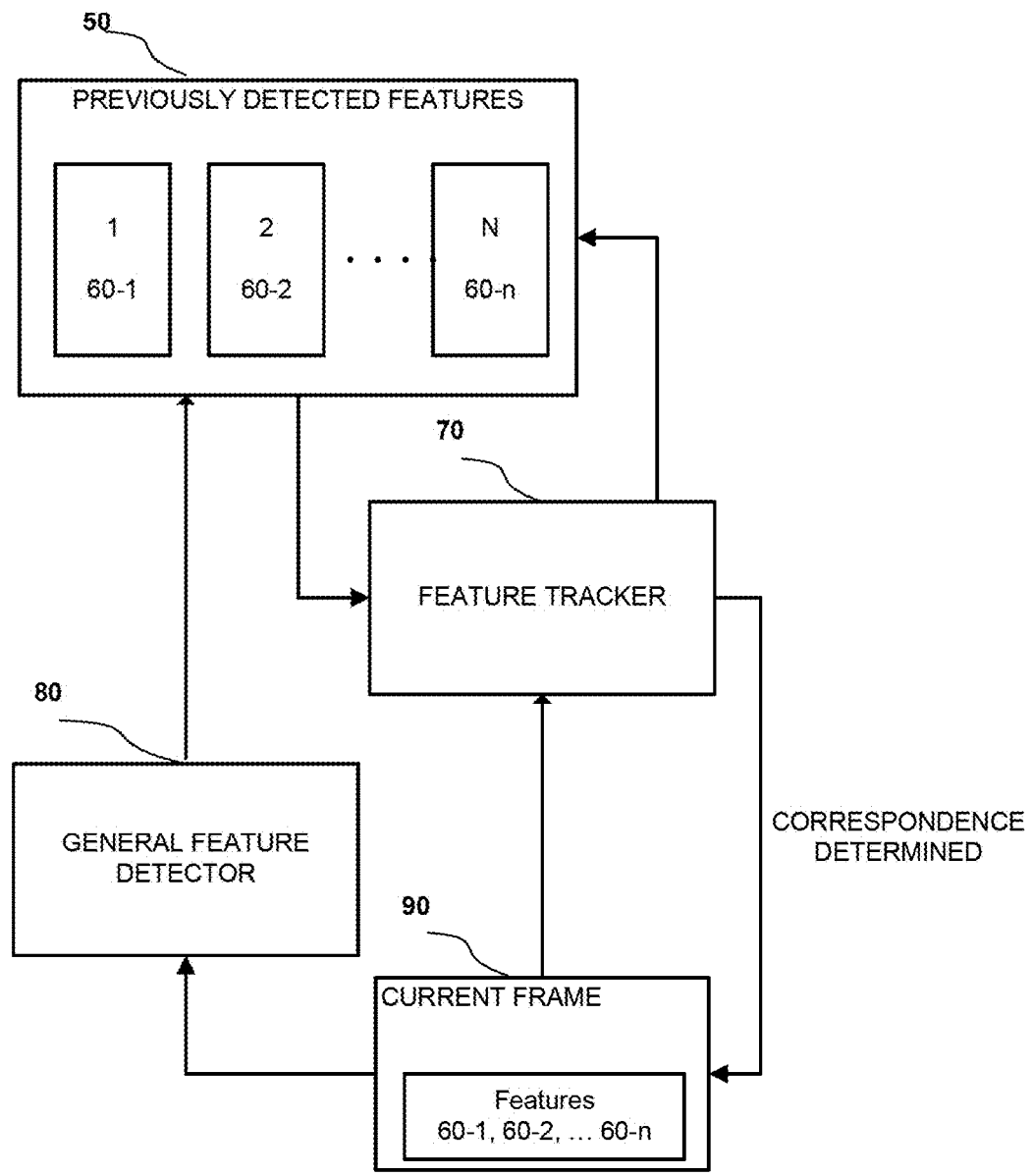
FIG. 2 is a block diagram depicting feature tracking according to an embodiment of the invention.

FIG. 2 demonstrates the use of a feature tracker 70 to track features 60-1, 60-2, . . . , 60-n. A feature detector 80 (for example, SIFT or SURF) is used to identify features in the current frame. Detected feature instances in the current frame 90 are matched to previously detected (or tracked) features 50. In one embodiment, prior to the association step, the set of candidate feature detections in the current frame can be sorted using an auto-correlation analysis (ACA) metric that measures feature strength based on an autocorrelation matrix of the feature, using derivative-of-Gaussian filters to compute the image gradients in the autocorrelation matrix, as found in the Harris-Stephens corner detection algorithm [Harris, Chris and Mike Stephens, 1988, "A combined corner and edge detector," in Proc. of the 4th Alvey Vision Conference, pp. 147-151]. Feature instances with high ACA values are given priority as candidates for track extension. In one embodiment, feature instances lower in the ACA-sorted list are pruned from the set of candidate features if they are within a certain distance (e.g., one pel) of a feature instance higher in the list.

In different embodiments, feature descriptors (e.g., a SURF descriptor) or the feature pel vectors themselves may serve as the feature models for the purpose of determining track extensions. In one embodiment, previously-tracked features, depicted as regions 60-1, 60-2, . . . , 60-n in FIG. 2, are tested one at a time for track extensions from among the newly detected features in the current frame 90. In one embodiment, the most recent feature instance for each feature track serves as a focal point (or "target feature") in the search for a track extension in the current frame. All candidate feature detections in the current frame within a certain distance (e.g., 16 pels) of the location of the target feature are tested, and the candidate having minimum MSE with the target feature (either in pel space or descriptor space) is chosen as the extension of that feature track. In another embodiment, a candidate feature is disqualified from being a track extension if its MSE with the target feature is larger than some threshold.

In a further embodiment, if no candidate feature detection in the current frame qualifies for extension of a given feature track, a limited search for a matching region in the current frame is conducted using either the motion compensated prediction (MCP) algorithm within H.264 or a generic motion estimation and compensation (MEC) algorithm. Both MCP and MEC conduct a gradient descent search for a matching region in the current frame that minimizes MSE (and satisfies the MSE threshold) with respect to the target feature in the previous frame. If no matches can be found for the target feature in the current frame, either from the candidate feature detection or from the MCP/MEC search process, the corresponding feature track is declared "dead" or "terminated."

In a further embodiment, if two or more feature tracks have feature instances in the current frame that coincide by more than some threshold (for example, 70% overlap), all but one of the feature tracks are pruned, or dropped from further consideration. The pruning process keeps the feature track that has the longest history and has the largest total ACA, summed over all feature instances.

In another embodiment, mid-point normalization can be performed on feature tracks by calculating a "smoothed" set of track locations and then adjusting the locations of features that are "far" from the normalized mid-points, a process termed center adjustment.

Summarizing the above, the following steps are common to many embodiments of the invention: feature detection (SURF or face), feature modeling (SURF descriptors, spectral histograms), ACA-based sorting of candidate features, and feature association and tracking via minimization of MSE from among candidate features, supplemented by MCP/MEC searching for track extensions and by center adjustment of tracks. If the tracking is done using SURF descriptors, the processing stream is termed the SURF tracker. If the tracking is done using color histograms, the processing stream is termed the spectral tracker.

Figure 3:
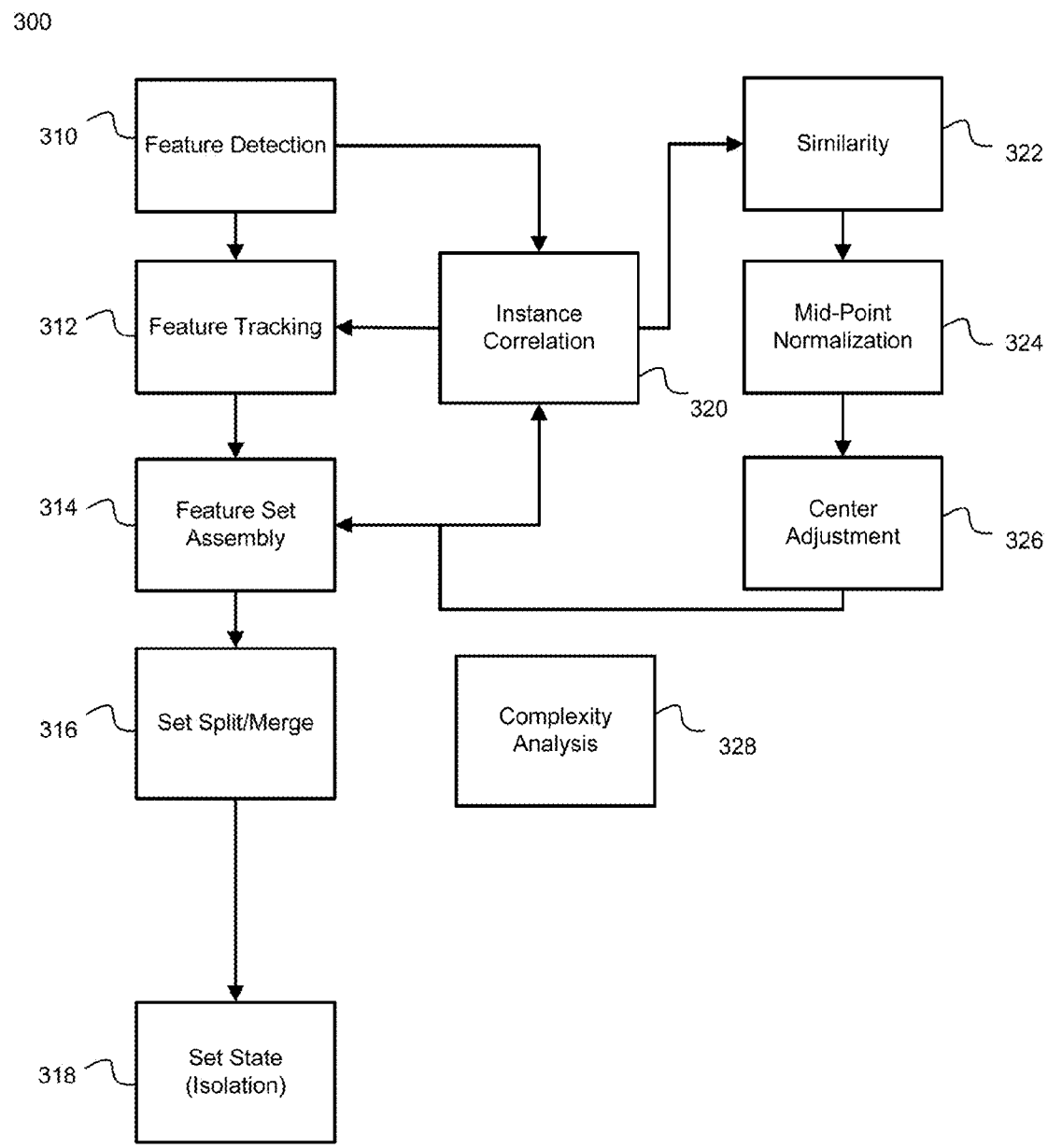
FIG. 3 is a flow diagram of a process of model extraction and generating feature models employed by an example embodiment of the repository.

FIG. 3 presents a flow diagram 300 of the basic steps in the feature-based processing stream (FPS) described above. Given a particular video, the FPS begins by detecting features in the video 310. The FPS then correlates (associates) instances of the detected features 320, possibly using compact feature models instead of the feature pels themselves. The FPS then tracks the detected and correlated features 312. The FPS also determines similarity in the correlated instances of the features 322 and performs a mid-point normalization on the similar correlated instances of the features 324. Based on the normalized mid-points, the FPS adjusts the centers of the correlated features 326, which then feed back into the tracker 312. Based on at least one of the tracked features 312, correlated instances of features 320, and correlated instances of the features with adjusted centers 326, the FPS assembles feature sets 314 of associated feature instances. In a further embodiment, the FPS can split or merge feature sets 316 based on different criteria. The FPS can also set the state of the model, e.g. to isolation 318. In one embodiment, an isolated model is a model that should no longer be edited because it is finalized. In another embodiment, the repository can analyze the complexity of the video as well during generation of the model 328. A person of ordinary skill in the art can recognize that the process described above can execute in any order and does not necessarily occur in the order described above.

Characteristic Features and Feature Clustering

The sections above outline how features can be detected, modeled, associated, and tracked through the frames of a video (termed an "input" video here, for clarity). The present invention seeks to preserve or "persist" all the feature information within an input video that is useful for improving compression within another "target" video (defined as a video to be encoded). In one embodiment, the feature information is stored in a file. In other embodiments, the feature information may be stored in a relational database, object database, NoSQL database or other data structure. More details on the storage of feature information follow below. To be useful and effective for improving compression in another video, however, the feature information from the input video must capture the feature content of the input video comprehensively yet succinctly.

After the steps of feature detection, modeling, association, and tracking, the feature information in an input video is contained in a set of feature tracks. To reduce this information into a suitably compact yet representative form, the first step is to choose a representative or characteristic feature for each feature track. In one embodiment, the characteristic feature for a given feature track is the first (earliest) instance of the feature in the track. In another embodiment, the characteristic feature for a given feature track is the arithmetic mean of all the feature instances in the track. The process of selecting a characteristic feature for each feature track reduces the feature information for an input video from a set of feature tracks to a set of characteristic features.

The next step in reducing the feature information in an input video into a suitably compact yet representative form is to cluster similar characteristic features together. Characteristic features can be grouped or clustered together using techniques well known in the art. In one embodiment where the tracker is the spectral tracker detailed above, clustering is based on spectral color maps of the characteristic features. The "U" and "V" (chroma) components from YUV color space data are treated as a two-component vector. Different values of the U/V components correspond to different colors in a spectral color map. A histogram is created from the color map and may contain any number of bins k that summarize the full range of U/V component values. In one example embodiment, $k=5$. In another embodiment where the tracker is the SURF tracker detailed above, clustering is based on length-64 SURF feature descriptor vectors of the characteristic features. Once the feature model domain for clustering is established (e.g., color histograms or SURF descriptors in the examples above), any standard clustering algorithm can be applied to perform the clustering. In a preferred embodiment, clustering is done through the k-means clustering algorithm. The k-means algorithm assigns all characteristic features in the input video to one of m clusters. In one example embodiment, $m=5$. For each cluster, the k-means algorithm computes a centroid that represents the arithmetic mean of the cluster members.

Figure 4A:
FIG. 4A is a screenshot of a feature-based compression tool in accordance with example implementations.
Figure 4B:
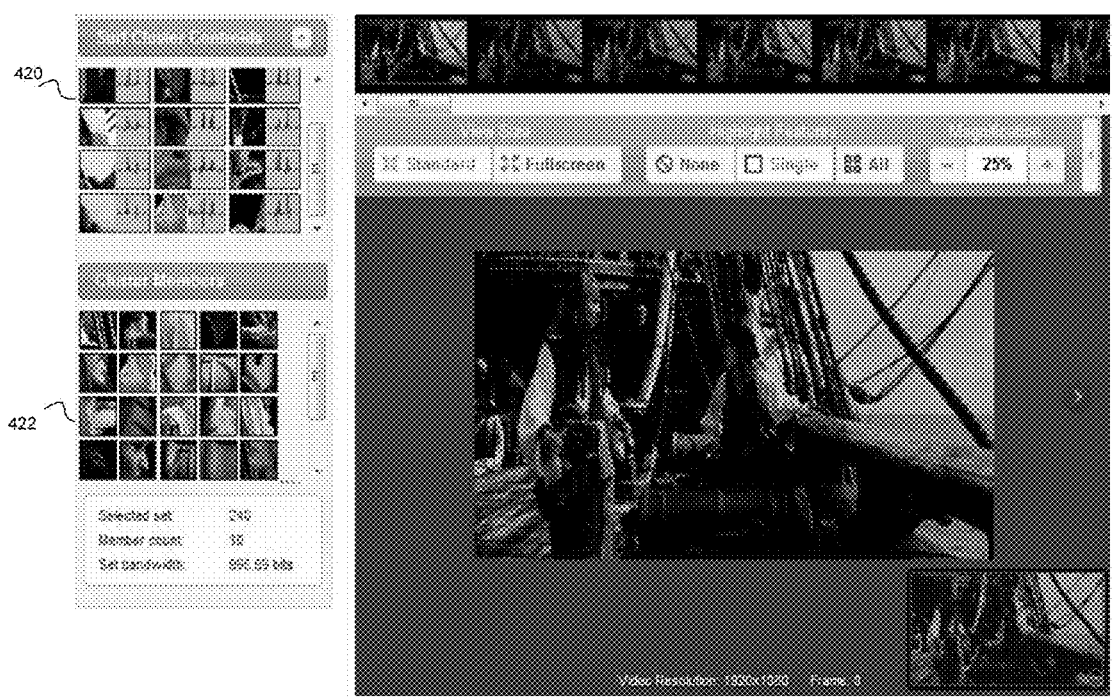
FIG. 4B is a screenshot of a feature-based compression tool in accordance with example implementations.

FIGS. 4A and 4B are screenshots of a feature-based display tool in accordance with example implementations of the spectral tracker (FIG. 4A) and the SURF tracker (FIG. 4B). The upper left displays in each figure show the results after clustering characteristic features based on their spectral color maps (416 in FIG. 4A) or on their SURF descriptors (420 in FIG. 4B). Each characteristic feature represents one or more feature members (24 in 414). Each cluster (ten in 416 and twelve in 420) is represented by the pels of the cluster centroid as well as the corresponding feature model (the spectral color map in 416 or the SURF descriptor in 420) for the centroid. Each cluster has a certain number of characteristic feature members. Eight characteristic feature members 418 are depicted for an example color spectral cluster 418 in FIG. 4A, while twenty plus characteristic feature members 422 are depicted for an example SURF cluster 420 in FIG. 4B.

It should be noted that if there are too many members in the m clusters, a second level of sub-clustering can be performed. In one example embodiment, each of m color spectral clusters are divided into 1 sub-clusters, where m is 5 and 1 ranges from 2 to 4.

After the initial set of m clusters have been formed, the final step in reducing the feature information in an input video into a suitably compact yet representative form is to select a subset of n cluster members to represent each cluster. The reason this step is necessary is that a cluster can have dozens of cluster members, whereas the number of representative cluster elements n needs to be relatively small for effective use in compression; in one example embodiment, $n=5$. Selection of representative cluster elements is usually based on the cluster centroid. In one embodiment, the orthogonal matching pursuit (OMP) algorithm is used to select n cluster members that best approximate the cluster centroid in the least redundant way. In another embodiment, the n cluster members are selected to be the ones having largest inner product with the cluster centroid; cluster members selected in this fashion are more redundant than those selected using OMP.

Once the most representative cluster members are selected for each cluster, the feature information for the input video is ready to be saved. The saved feature information consists of m clusters of n cluster members, with each cluster member being a characteristic feature of a particular feature track, and with each characteristic feature having a set of pels associated with its corresponding feature region (16 16 in one embodiment of the invention). Each cluster has a centroid, whose pels are saved as well as the associated feature model (e.g., a color histogram or a SURF descriptor). Also, because of the way the invention uses the saved feature information for encoding (for "offset processing"; see below for further details), the saved feature information also consists of the pels from the regions surrounding the feature region for each cluster member. In one embodiment, "surrounding" regions are defined as those within one 16×16 macroblock in any direction, so a feature region and its surroundings comprise a 48×48 super-region. Thus, the saved feature information is comprised of the pels from m clusters of n super-regions, plus the pels and feature models from the m cluster centroids.

The feature-based processing stream outlined above (feature detection, modeling, association, tracking, characteristic feature selection, clustering, cluster member selection, and saving of feature information) can be extended from one input video to multiple input videos. In the case of more than one input video, characteristic features representing feature tracks from all input videos are used to create the clusters.

Reusing Feature Models for Offline Feature-Based Compression

Model-Based Compression Framework

Once the feature-based processing stream outlined above (by 300 in FIG. 3) has been applied to an input video (or multiple input videos), the saved feature information can be reused to improve compression in a "target" video (a video to be encoded, likely different from the input video[s]). This reuse of feature information for compression takes place within the model-based compression framework (MBCF) outlined in the co-pending '940 application, relevant elements of which are included below (and generally referenced 924).

The MBCF begins with similar steps as the feature-based processing stream outlined above: features are detected, modeled, and associated, but with respect to the target video. In a preferred embodiment, the features are detected using the SURF detection algorithm and modeled and associated using SURF descriptors.

Figure 5:
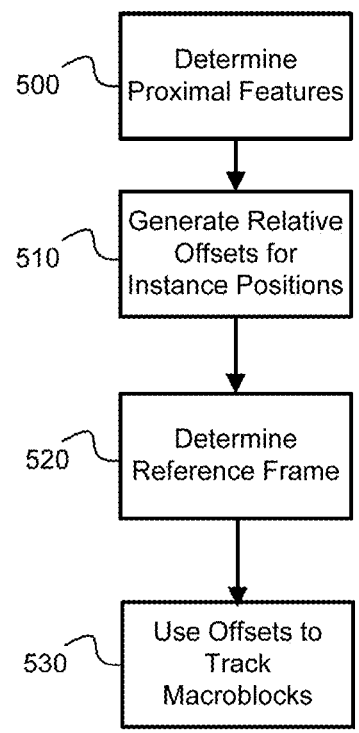
FIG. 5 is a block diagram illustrating the processing elements of modeling macroblocks as features that are aligned with macroblock boundaries.

Next, the MBCF uses feature tracks to relate features to macroblocks, as depicted in FIG. 5. A given feature track indicates the location of a feature across frames, and there is an associated motion of that feature across frames. Using the location of the feature in the two most recent frames prior to the current frame, one can project the position of the feature in the current frame. This projected feature position then has an associated nearest macroblock, defined as the macroblock having greatest overlap with the projected feature position. This macroblock (now the target macroblock that is being encoded) has been associated to a specific feature track whose projected position in the current frame is nearby the macroblock (500 in FIG. 5). It is possible for a single macroblock to be associated with multiple features, so one embodiment of the MBCF selects the feature having maximum overlap with the macroblock as the associated feature for that macroblock.

Next, the MBCF calculates an offset 510 between the target macroblock and the projected feature position in the current frame. When the MBCF operates in online mode (generating predictions entirely from decoded pels earlier in the same video), this offset generates predictions for the target macroblock by using earlier feature instances in the associated feature's track. Online predictions for the target macroblock can be generated by finding the regions in the reference frames with the same offsets (520, 530) from earlier feature instances as the offset between the target macroblock and the projected feature position in the current frame.

Given a target macroblock (the current macroblock being encoded), its associated feature, and the feature track for that feature, the MBCF generates a primary or key prediction for the target macroblock. Data (pels) for the key prediction comes from the most recent frame (prior to the current frame) where the feature appears, henceforth referred to as the key frame. The key prediction is generated after selecting a motion model and a pel sampling scheme. In one embodiment of the MBCF, the motion model can be either "0th order," which assumes that the feature is stationary between the key frame and the current frame, or "1st order," which assumes that feature motion is linear between the 2nd-most recent reference frame, the key frame, and the current frame. In either case, the motion of the feature is applied (in the backwards temporal direction) to the associated macroblock in the current frame to obtain the prediction for the macroblock in the key frame. In one embodiment of the MBCF, the pel sampling scheme can be either "direct," in which motion vectors are rounded to the nearest integer and pels for the key prediction are taken directly from the key frame, or "indirect," in which the interpolation scheme from conventional compression such as H.264 is used to derive a motion-compensated key prediction. Thus, the MBCF invention can have four different types of key prediction, depending on the motion model (0th or 1st order) and the sampling scheme (direct or indirect).

The MBCF also produces refined key predictions by modeling local deformations through the process of subtiling. In the subtiling process, different motion vectors are calculated for different local portions of the macroblock. In one embodiment of the MBCF, subtiling can be done by dividing the 16 16 macroblock into four 8×8 quadrants and calculating predictions for each separately. In another embodiment, subtiling can be carried out in the Y/U/V color space domain by calculating predictions for the Y, U, and V color channels separately.

In addition to the primary/key prediction for the target macroblock, the MBCF also generates secondary predictions based on positions of the associated feature in reference frames prior to the key frame. In one embodiment, the offset from the target macroblock to the (projected) position of the associated feature in the current frame represents a motion vector that can be used to find secondary predictions from the feature's position in past reference frames. In this way, a large number of secondary predictions can be generated (one for each frame where the feature has appeared previously) for a given target macroblock that has an associated feature. In one embodiment, the number of secondary predictions can be limited by restricting the search to some reasonable number of past reference frames (for example, 25).

Once primary (key) and secondary predictions have been generated for a target macroblock, the overall reconstruction of the target macroblock can be computed based on these predictions. In one embodiment of the MBCF, following conventional codecs, the reconstruction is based on the key prediction only, henceforth referred to as key-only (KO) reconstruction.

In another embodiment of the MBCF, the reconstruction is based on a composite prediction that sums the key prediction and a weighted version of one of the secondary predictions. This algorithm, henceforth referred to as PCA-Lite (PCA-L), involves the following steps:

Create the vectorized (1-D) versions of the target macroblock and key prediction. These can then be denoted as the target vector t and key vector k.

Subtract the key vector from the target vector to compute a residual vector r.

Vectorize the set of secondary predictions to form vectors si (Without loss of generality, assume that these secondary vectors have unit norm.) Then subtract the key vector from all the secondary vectors to form the key-subtracted set, si−k. This has the approximate effect of projecting off the key vector from the secondary vectors.

For each secondary vector, calculate a weighting $c=r^T(s\_i-k)$

For each secondary vector, calculate the composite prediction as $t\hat{}=k+c\cdot(s\_i-k)$.

In general, the steps in the PCA-Lite algorithm approximate the operations in the well-known orthogonal matching pursuit algorithm [Pati, Y. C. et al., 1993, "Orthogonal matching pursuit: Recursive function approximation with applications to wavelet decomposition," in Proc. of the 27th Asilomar Conference, pp. 40-44], with the composite prediction meant to have non-redundant contributions from the primary and secondary predictions. In another embodiment, the PCA-Lite algorithm described above is modified so that the key vector in Steps 3-5 above is replaced by the mean of the key and the secondary vector. This modified algorithm is henceforth referred to as PCA-Lite-Mean.

The PCA-Lite algorithm provides a different type of composite prediction than the bi-prediction algorithms found in some standard codecs. Standard bi-prediction algorithms employ a blending of multiple predictions based on temporal distance of the reference frames for the individual predictions to the current frame. By contrast, PCA-Lite blends multiple predictions into a composite prediction based on the contents of the individual predictions.

Note that the formation of composite predictions as described above does not require feature-based modeling; composite predictions can be formed from any set of multiple predictions for a given target macroblock. Feature-based modeling, however, provides a naturally-associated set of multiple predictions for a given target macroblock, and composite predictions provide an efficient way to combine the information from those multiple predictions.

Model Reuse for Offline Streams in Model-Based Compression Framework

The model-based compression framework (MBCF) can also operate in offline mode, using feature information generated and stored by the feature-based processing stream as outlined above.

In one embodiment, the MBCF in offline mode detects features in the target video using the SURF detection algorithm, models the detected features using SURF descriptors, and generates key predictions under the 0th order motion model (assuming that the feature is stationary between the key frame and the current frame) and the "direct" interpolation scheme.

The MBCF in offline mode then reads in the appropriate feature information from the input video(s) that has been stored by the feature-based processing stream. (Recall that the saved feature information is comprised of the pels from m clusters of n super-regions, plus the pels and feature models from the m cluster centroids.) In one embodiment, the MBCF reads in the cluster elements from the cluster whose SURF descriptor is closest (has smallest mean-squared error) to the SURF descriptor of the feature associated with the target macroblock (the current macroblock being encoded).

Once a particular cluster has been read in, the MBCF in offline mode then generates secondary predictions by extracting the pels from each super-region in the cluster that are offset from the center of the super-region in the same way as the target macroblock is offset from its associated feature in the target video. In this way, n secondary predictions are generated, one for each cluster member.

In one embodiment, the secondary predictions generated by the MBCF in offline mode are then combined with the key prediction using the PCA-Lite or PCA-Lite-Mean algorithms as described above.

In another embodiment, the secondary predictions may be treated as primary predictions, potentially replacing the within-video key prediction if they produce lower error or encoding cost. In such an embodiment, where primary predictions can come from an offline source (outside the target video), a normalization step (assuming, for example, an affine motion model) may be applied to the offline predictions to ensure a closer match to the target macroblock.

In summary, the MBCF in offline mode reuses feature models for compression by following these steps: (1) detect features for each frame in the target video; (2) model the detected features; (3) associate features in different frames to create feature tracks; (4) use feature tracks to predict feature locations in the "current" frame being encoded; (5) associate macroblocks in the current frame that are nearby the predicted feature locations; (6) generate a key prediction for the macroblocks in Step 5 based on the location of the features in the most recently encoded key frame; (7) read in feature information generated from an input video by determining the cluster whose centroid descriptor is closest to the descriptors of the target video's features; (8) generate secondary predictions from the feature information read in in Step 7.

Forming Feature Model Libraries

Simple Model Libraries: Direct Saving of Feature Information Only

As noted above, there is a basic set of feature information that can be generated from an input video and then preserved. This feature information can then be re-used within a model-based compression framework (MBCF) for improving the compression of another "target" video to be encoded. Directly saving the feature information into files, databases or data stores represents the simplest form of a feature model library that organizes and catalogs the feature information from one or more input videos.

In one embodiment, information from the feature detection and feature tracking steps is saved into a file, database or data store. This information may include, but is not limited to:
- the name of the input video from which the features were detected;
- a list of feature tracks, each with an associated feature ID;
- for each feature track, the "length" of the track (equal to the number of feature instances contained in the track) and its total bandwidth, defined as the total number of bits required by conventional compression (e.g., H.264) to encode all the feature instances in the track;
- for each feature instance in a track, the type of detection (e.g., SURF, face), the frame where the detection occurred, the x/y coordinates of the center of the feature, and the bandwidth of the feature;
- for each feature track, the pels from the track's characteristic (representative) feature.

It is important to note that the information from the feature detection and tracking steps of the input video is not directly used in the model-based compression framework for compression of the target video. However, feature detection and tracking information must be saved if the feature model library needs to accumulate feature information from more than one input video, because the composition of the feature clusters that are used for compression changes when tracks from multiple videos are combined.

In one embodiment, information from the feature clustering step is saved into a file, database or data store, separate from the feature detection and tracking information. The feature clustering information may include, but is not limited to:
- a list of clusters, each with an associated index;
- for each cluster, the number of members in the cluster and the pels and feature model associated with the cluster centroid;
- for each cluster member (itself a characteristic feature representing a feature track), the pels from the "super-region" surrounding the feature, as well as the associated feature model;
- various parameters associated with the way the clustering was performed (for example, tolerance and iterations from k-means clustering).

When feature information from multiple input videos needs to be accumulated by the feature model library, several approaches may be taken. In one embodiment, feature tracks from all the input videos are simply aggregated, and the clustering is redone on the aggregate set of feature tracks. However, this approach becomes problematic as the total number of feature tracks increases, because either the sizes of the resulting feature clusters will become larger (making the clusters less informative) or the number of feature clusters will increase (thereby increasing the encoding cost of indexing into the clusters).

In another embodiment when the feature model library contains multiple input videos, feature tracks are prioritized prior to clustering. That is, the aggregate set of feature tracks is pruned prior to clustering such that only the most "important" feature tracks are retained for clustering. In one embodiment, feature tracks are prioritized according to their track bandwidth, defined as the total number of bits required by conventional compression (e.g., H.264) to encode all the feature instances in the track. Those features that are difficult for conventional compression to encode are identified as high-priority. In another embodiment, feature tracks are prioritized according to redundancy, defined loosely by the repetition (lack of variability) of a feature in a track. Feature track redundancy may be measured by calculating various statistics (rank, condition number) associated with an ensemble matrix comprised of the different feature instances in the track. Highly redundant features have reoccurred often in an input video and are thus identified as important for compression. In another embodiment, feature tracks are prioritized according to similarity to specific types of important features, such as faces. Those features that belong to a specific feature type are identified as important. In a further embodiment, the specific feature types may be specialized according to semantic content, such as a particular sports team, a particular TV show, etc.

Figures 6A, 6B:
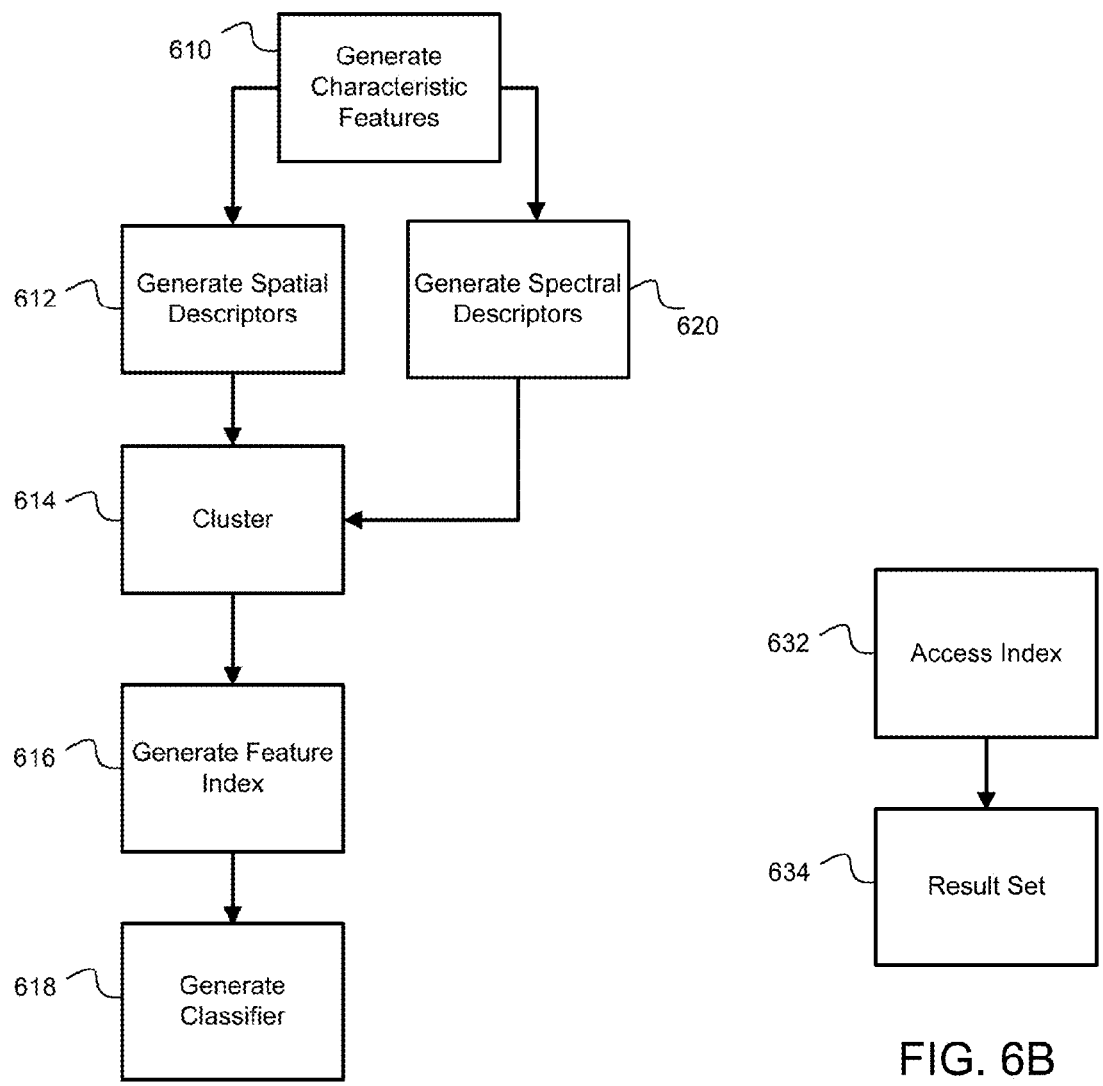
FIG. 6A is a flow diagram of a process of generating an index employed by the repository.
FIG. 6B is a flow diagram of a process of using an index employed by the repository.

FIG. 6A summarizes the general steps for storing and then accessing feature information in the feature model library described above, following the feature-based processing stream (FPS) illustrated in FIG. 3. After feature detection, modeling, association, and tracking, the FPS generates and stores characteristic features for the feature tracks 610. The FPS also generates and stores spatial (SURF) descriptors 612 and spectral (color histogram) descriptors 620 of the characteristic features. The FPS clusters the spatial descriptors and the spectral descriptors 614 and calculates the cluster centroids. From the clusters, the FPS generates a feature index 616, whose elements are the descriptors of the cluster centroids. The repository then generates a classifier based on the feature index that can be used to access the features in the cluster 618. In FIG. 6B, when encoding a new target video using the model-based compression framework (MBCF) described above, the FPS responds to a detected feature in the target video by accessing the index 632 and retrieving the associated result set 634, comprised of cluster members. The cluster members can then be used within the MBCF, as described above, to aid compression of the corresponding feature regions in the target video. A person of ordinary skill in the art can recognize that the process described above can execute in any order and does not necessarily occur in the order described above.

Advanced Model Libraries: Hash-Based Indexing of Video Repositories

Figure 7:
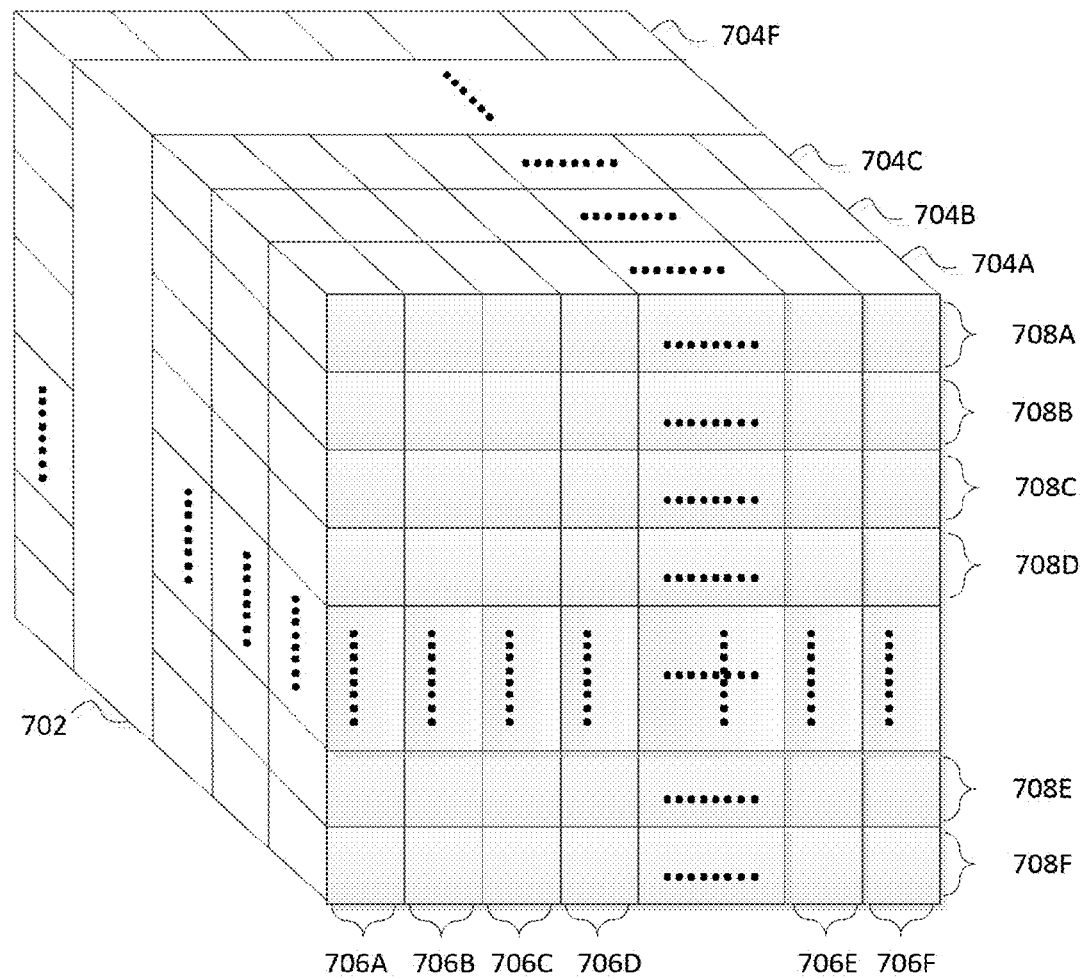
FIG. 7 is a block diagram of a normalization cube. The normalization cube is a collection of correlation tables.

Instead of explicitly saving feature information directly into files, databases or data stores as outlined above for the simplest version of the feature model library, one can make use of hash-based indexing to form a more advanced feature model library that accesses data from a video repository. A video repository contains the data pels from one or more input videos that have been processed 300 with a feature-based processing stream (FPS), in addition to the feature models 980 (FIGS. 9A, 9B) generated by the FPS. This is in contrast to the simple feature model library described in the previous section, which only contains the feature pels and their associated models—not all the pels in the entire input video(s). Hash-based indexing provides an efficient way of accessing feature information from a video repository. Feature-based processing can be thought of as a sparse sampling of the video datacube 702 in FIG. 7, whose dimensions are frames (704A-704F) by rows (708A-708F) by columns (706A-706F). Feature instances will usually occur in only a small percentage of locations in a given video datacube.

Figure 8A:
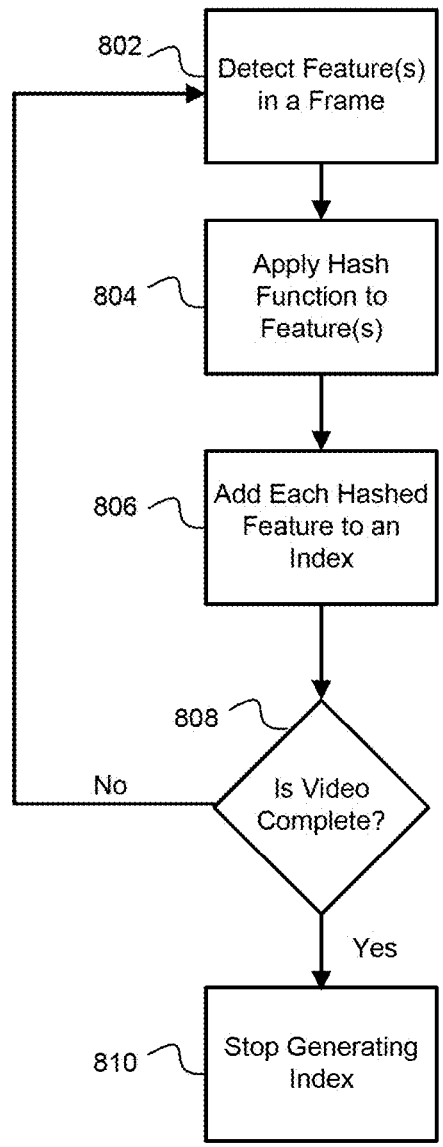
FIG. 8A is a flow diagram of an example embodiment of a process to generate an index.

FIG. 8A shows a flow diagram of an example embodiment of a process to generate a hash-based index. The feature-based processing stream (FPS) in FIG. 8A begins by detecting features in a frame 802 of an input video. The FPS then applies a hash tag to each of the detected features 804. The hash tag uses a one way hash function that converts the information that identifies a detected feature (its x/y location, frame, extent, and associated model 980) into a hash value so that the feature can be accessed easily from the video repository at a later time. The FPS then adds each hashed feature and its corresponding hash value to an index 806, which is stored in the video repository with the encoded videos themselves. The FPS then determines whether all frames of the input video have been analyzed 808. If all frames have been analyzed, the FPS stops generating the index 810. If not all frames of the input video have been analyzed, then the FPS detects features in the next frame 802.

Figure 8B:
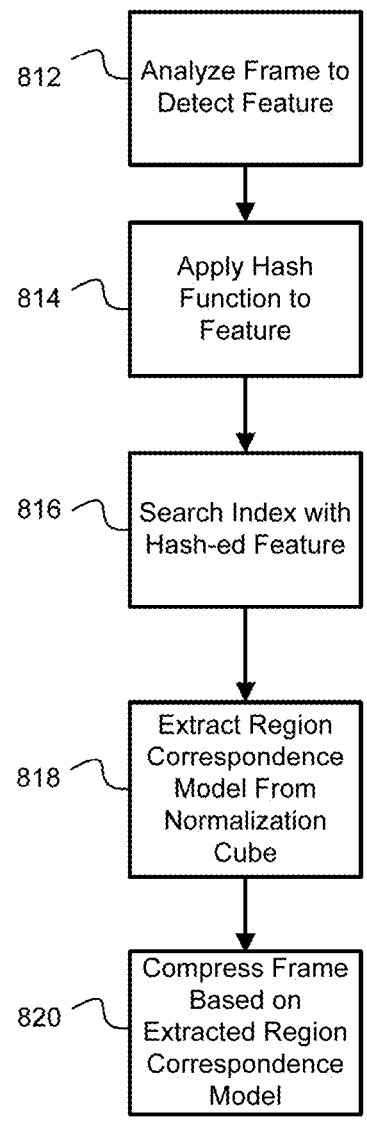
FIG. 8B is a flow diagram of an example embodiment of process to look up a feature using the index.

FIG. 8B presents a flow diagram of an example embodiment of a process to access a feature using the hash-based index. The FPS analyzes a frame of input video to detect a feature 812. The FPS then applies the hash function to the detected feature 814 to generate its hash value. The FPS then searches the index with the hash value of the detected feature to find and extract the corresponding feature (and its associated feature model 980) in the video repository 816, 818. In another embodiment, the FPS can extract a plurality of feature models for a given feature from the video datacube. The FPS then compresses 820 the detected feature based on the extracted feature model 980 or associated feature information.

A person of ordinary skill in the art can recognize that the compression method described above can be applied to multiple frames and that compression does not have to occur on a frame by frame basis. However, the process shown in FIG. 8B exemplifies the general principles behind using an index to access feature information from a sparsely-filled video datacube contained in a repository of previously-encoded videos; the accessed feature information can then be used to aid the compression of new target videos.

Note that the underlying feature-based processing stream (FPS) in FIGS. 8A-8B is different than the FPS outlined in the above sections (and depicted in FIGS. 3 and 6A), which includes feature tracking and clustering in addition to feature detection. More significantly, the FPS in FIGS. 8A-8B accesses feature information from a video repository, which contains the entirety of pels from its input videos, rather than from a set of files that contain only the feature pels and information (as used by the FPS in FIGS. 3-6A).

Figure 8C:
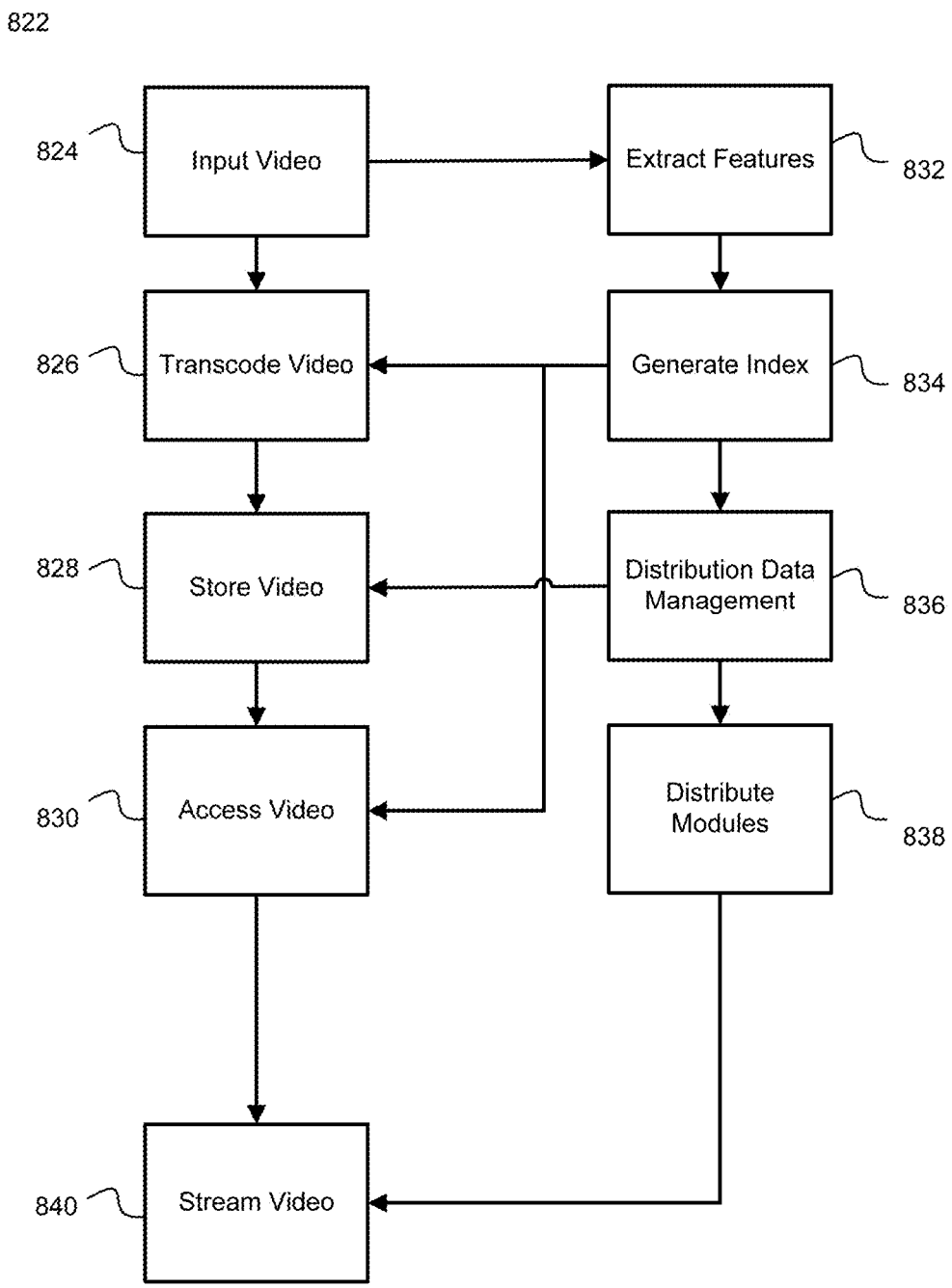
FIG. 8C is a flow diagram illustrating another process employed by an example embodiment of the repository.

FIG. 8C presents a flow diagram 822 illustrating the general steps in the underlying FPS in FIGS. 8A-8B, according to an example embodiment of the invention. The FPS processes an input video 824 and detects features from the video, as described in the present application 832. The FPS then generates a hash-based index of features in the video 834. Using the extracted features 832 and the generated index 834, the FPS transcodes the video according to compression techniques known in the art and/or compression techniques described in the present application 826. The FPS, based on the generated index 834, manages the distribution of data 836. For example, the encoded video can be stored in a particular cluster of servers within the video repository. The video may be stored optionally in a storage structure, database, or other data structure organized for a large set of videos 828. Upon a request to access the video, the repository loads and accesses the requested video 830, the repository streams the requested video 840. After managing data distribution 836, the FPS can distribute modules from the repository 838 to aid streaming of the video 840. In one embodiment, the FPS distributes modules from the repository 838 to a client device to aid the streaming of videos 840 on the device. A person of ordinary skill in the art can recognize that the process described above can execute in any order and does not necessarily occur in the order described above.

Using Video Repositories with Generalized Compression Processing Streams

Figure 8D:
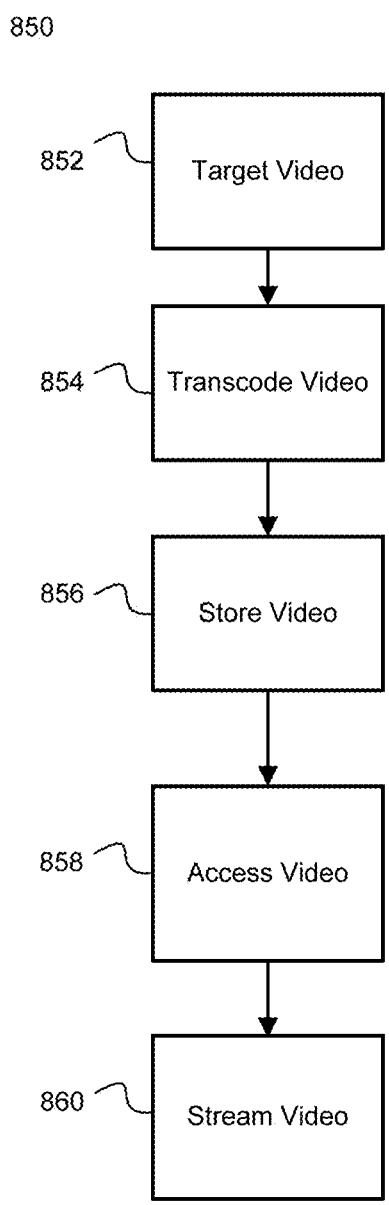
FIG. 8D is a flow diagram illustrating a process employed by an example embodiment of the repository.

Video repositories do not have to be used together with a feature-based processing stream. FIG. 8D illustrates the general use of a video repository with a compression scheme that does not necessarily involve model-based processing. The generalized processing flow (GPF) 850 of FIG. 8D first accepts a target video to be stored in the repository 852. The repository transcodes the video according to compression techniques known in the art (not necessarily model-based) and/or compression techniques described in the present application 854. The GPF stores the video, optionally in a storage structure, database, or other data structure organized for a large set of videos 856. Upon a request to access the video, the GPF loads and accesses the requested video from the repository 858. The GPF then streams the requested video 860. A person of ordinary skill in the art can recognize that the process described above can execute in any order and does not necessarily occur in the order described above. For example, in one embodiment, the GPF can transcode the video 854 after it accesses the video 858 but before it streams the video 860. In another embodiment, the GPF can initially transcode the video 854 after inputting the video 852, and then it can provide an additional transcoding to the video 854 after accessing the video 858 but before streaming the video 860.

Applications of Model Libraries

Basic Operation: Global Model Libraries and (Personal) Smart Model Libraries

Aspects of the invention may include a feature model library stored on a server/cloud. By storing model libraries on the cloud and accessing the feature information in the libraries when needed, the invention can stream high definition video at lower bandwidth than conventional codecs, with little or no reduction in visual quality. The models 980 are reusable not only within a single video (the "online" mode of the model-based compression framework [MBCF] described above), but also across different, disparate videos (the "offline" mode of the MBCF). The system is able to identify, recognize, and reuse models from one high definition video to process and present video images in another. This reuse of models 980 reduces the file size of the libraries, enabling devices to reduce needed bandwidth when streaming video data.

The feature model libraries can reside in a cloud deployment (public or private) and preferably are only downloaded to a user's mobile device as needed. Similar in technique to how the Amazon Kindle (Trademark) and Apple iPad (Trademark) device applications manage content between the cloud and user devices today, the invention is able to store model libraries offline and deliver relevant models 980 to user devices as needed to aid video compression/decompression.

Figure 9A:
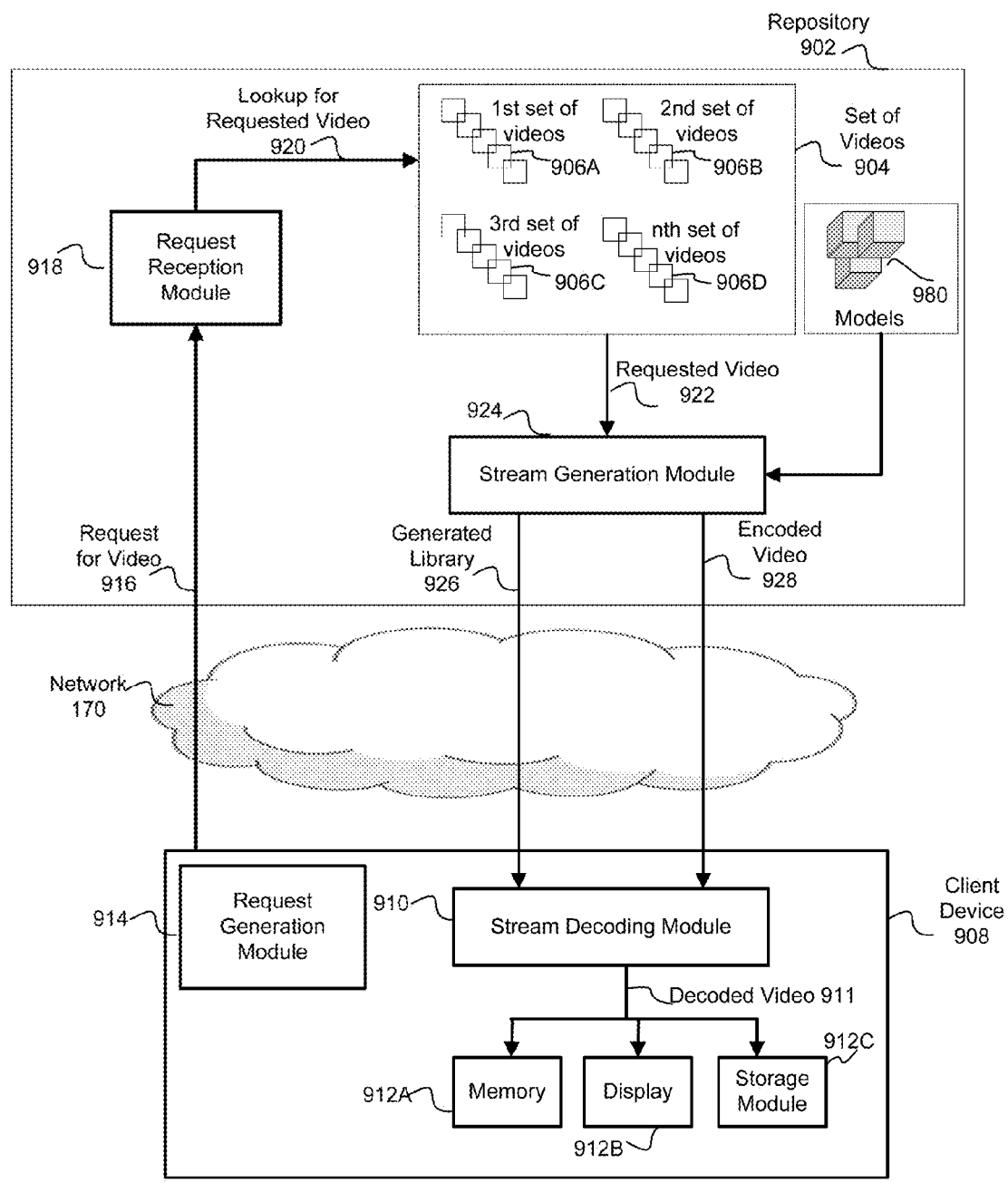
FIG. 9A is a block diagram of an example embodiment of a repository operatively connected with a client device over a network.

FIG. 9A is a block diagram of an example embodiment of a video repository 902 operatively connected with a client device 908 over a network 170. The repository 902 includes a set of encoded videos 904. The set of videos 904 includes a first set of videos 906A, a second set of videos 906B, a third set of videos 906C, and an Nth set of videos 906D. A person of ordinary skill in the art can recognize that the set of videos 904 can include any number of videos or sets of videos. The sets of videos 906A-906D within the set of videos 904 can each be related to each other. For example, the first set of videos 906A can be a complete season of episodes of a first particular television series. The second set of videos 906B can be a complete season of episodes of a second particular television series. Likewise, the third set of videos 906C and the Nth set of videos 906D can include other seasons or other television series. A person of ordinary skill in the art can further recognize that each of the sets of videos 906A-906D can include episodes from a television series, related movies (e.g., sequels or trilogies), sports broadcasts, or any other related video.

The repository 902 is operatively connected over the network 170 to a client device 908. The client device includes a request generation module 914. The request generation module 914 sends a request for video 916 over the network 170 to the repository 908. The repository 908 receives the request for video 916 at a request reception module 918. The request for video 916 is a request for a video included in the set of videos 904. Upon issuing the request for video 916, the client device 908 anticipates receiving the requested video and optionally prepares the appropriate codecs to decode the incoming bitstream responsive to the requested video.

The repository 902, in order to send the requested video to the client device 908, causes the request reception module 918 to issue a lookup for requested video 920 to the set of videos 904. The lookup for requested video 920 can be a request to activate a lookup function to the set of videos 904 data structure. The lookup request for requested video 920 can also be a request to a generated index that can efficiently find the requested video in the set of videos 904. The set of videos 904 responds to the lookup for requested video 920 by producing a requested video 922 to a stream generation module 924.

The stream generation module 924 produces a generated library 926 associated with requested video, plus the encoding of the requested video 928. The generated library 926 (also termed a smart model library) includes feature models needed to decode the requested encoded video 928. In one embodiment, the models in the generated smart model library 926 are derived from the video repository and a hash-based index of feature models 980 referencing the videos contained within the repository.

In another embodiment, the models in the generated smart model library 926 are derived from a global model library 980 that includes a set of reusable models (e.g., feature models). The models in the global library are reusable not only with a single video, but across different, disparate videos.

In total, the video repository 902 stores the encoded videos 904, the global model library 980 or the hash-based index of the models referencing the videos.

Both the generated library 926 and the encoded video 928 are transmitted over the network 170 to the client device 908. The library 926 can be transmitted to any device, including mobile devices like iPads, smartphones, and tablets. The client device 908 receives the generated library 926 and encoded video 928 at a stream decoding module 910.

The stream decoding module 910 decodes the encoded video 928 using the information in the generated library 926 and optionally other codecs known to the stream decoding module 910. The stream decoding module 910 outputs a decoded video 911. The decoded video 911 can be transmitted to at least one of a memory 912A, a display 912B, or a storage module 912C.

Versioned (Personal) Model Libraries

Figure 9B:
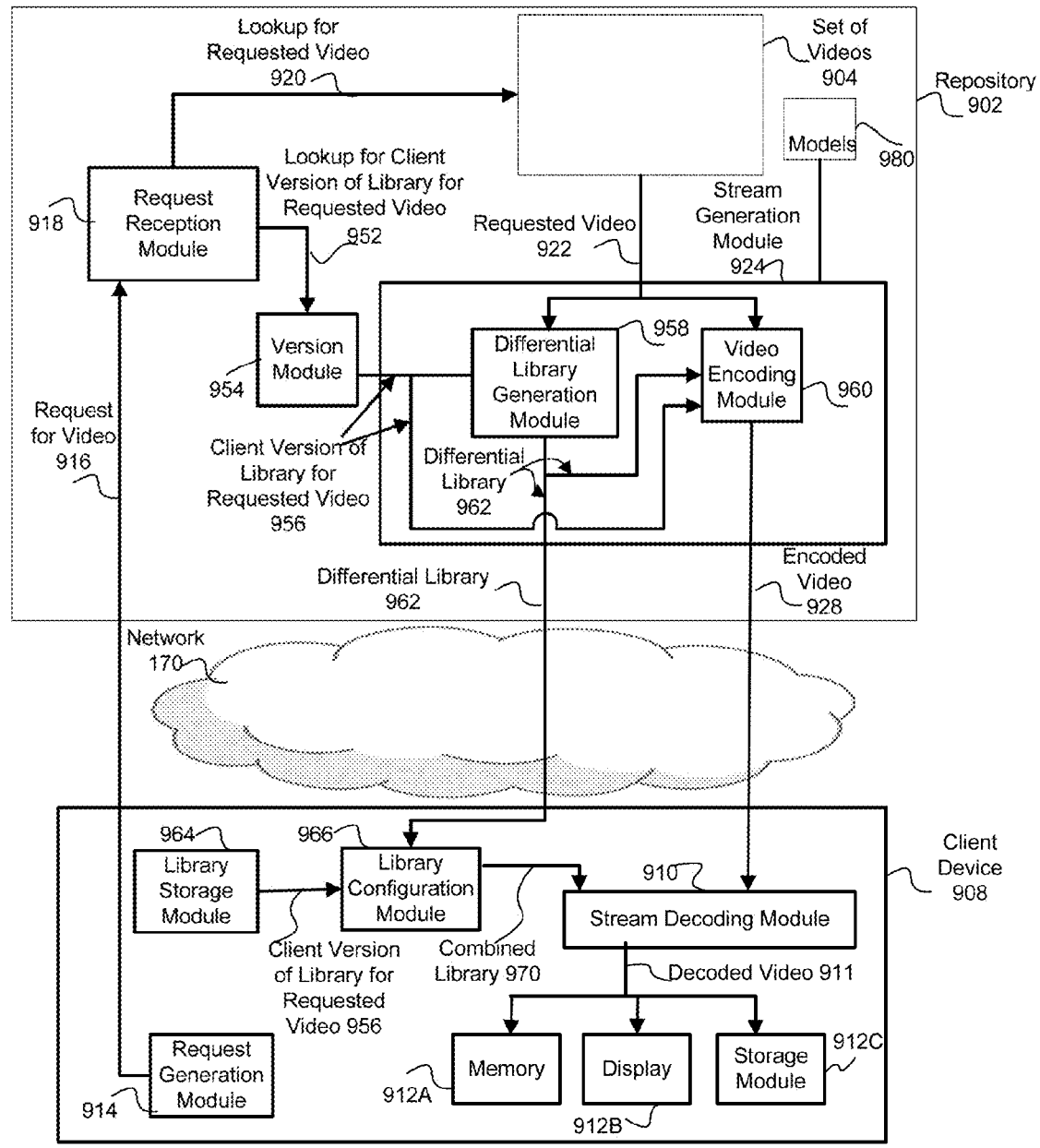
FIG. 9B is a block diagram of another example embodiment of a repository configured to communicate with the client device over the network.

FIG. 9B is a block diagram of another example embodiment of a video repository 902 configured to communicate with a client device 908 over a network 170. The repository 902 and the client device 908 are similar in operation to those referenced in FIG. 9A. However, additional modules, methods, and features are described in relation to FIG. 9B. A person of ordinary skill in the art can recognize that the modules of the repository 902 and the client device 908 are interchangeable between the embodiments described herein in the present application.

In one embodiment, the repository 902 and the client device 908 are configured to version the libraries used to decode videos. The client device 908 includes the request generation module 914. As described above, the request generation model 914 issues a request for video 916 to the request reception module 918. The request reception module 918 issues the lookup for requested video 920 to the set of videos 904, as described above. However, in one embodiment, the request reception module 918 issues a lookup 952 for a client version of the library for the requested video, to a versioning module 954. The versioning module determines, based on the lookup 952, a client version 956 of the library for the requested video. In many cases, a client device may request and download related videos that include related codecs or libraries. An example of a related video is a subsequent episode of a same TV show, which would include similar frames because of commonality among actors and sets used in the TV show. Another example is a sporting event, which includes commonality across its frames among fields, stadiums, athletes, logos, or sports equipment. Therefore, the client device 908 may already have many or all of the necessary models needed to decode the encoded video 928, if it previously downloaded a related video and library. In this scenario, an update to the library may be all that is necessary for the client to decode the encoded video 928. Sending just an update, instead of a full library, saves bandwidth within the transmission of data to the client device 908, and it can increase the speed with which the user of the client device 908 can begin watching the requested video, due to the smaller download size.

In one embodiment, the stream generation module 924 includes a differential library generation module 958 and a video encoding module 960. The stream generation module 924 receives the requested video 922 from the set of videos 904. The differential library generation model 958 receives the requested video and the client version of the library for the requested video 956. In one embodiment, the differential library generation module 958 determines, based on the requested video 922, the models 980, and the client version of the library for the requested video 956, the updates the client device 908 needs to decode the video within the model-based compression framework.

In another embodiment the differential library generation module 958 determines, based on the requested video 922, the hash-based index and the client version of the library for the requested video 956, the updates the client device 908 needs to decode the video within the model-based compression framework.

The differential library generation module 958 generates a differential library 962 that includes only the needed updates (additional feature models) to the library already stored in the client device 908 at the library storage module 964. The video encoding module 960 generates the encoded video 928 based on the differential library 962 and the client version of the library for the requested video 956. Use of client-specific library versions enables video distributors the ability to offer different levels of viewing experience depending on the models received at the client. For example, one client's library model could be used to help increase the quality of the video being viewed.

In another embodiment, the video encoding module 960 generates the encoded video by simply using models that provide an optimal compression. The differential library generation module 958 generates the differential library 962 based on the models that were used to encode the video and the knowledge of the client version of the library that is resident on the client device. In this embodiment, only additional models if any are included in the differential library.

The client device 908 receives the differential library 962 and the encoded video 928. The client device 908 receives the differential library 962 at a library configuration module 966. The library configuration module 966 loads the client version of the library for the requested video 956 from the library storage module 964. The library configuration module 966 combines the differential library 962 and the client version of the library for the requested video 956 into a combined library 970. The stream decoding module 910 then decodes the encoded video 928 using the combined library 970 and generates the decoded video 911, which is distributed to at least one of the memory 912A, the display 912B, and the storage module 912C. The system is able to identify, recognize, and reuse models from one high definition video to process and present video images in another. This reuse of models potentially reduces the total file size of the libraries needed for the decoding of multiple videos on the client device 908, since the same models can be reused to decode multiple videos.

Predictive Model Libraries

Figure 10:
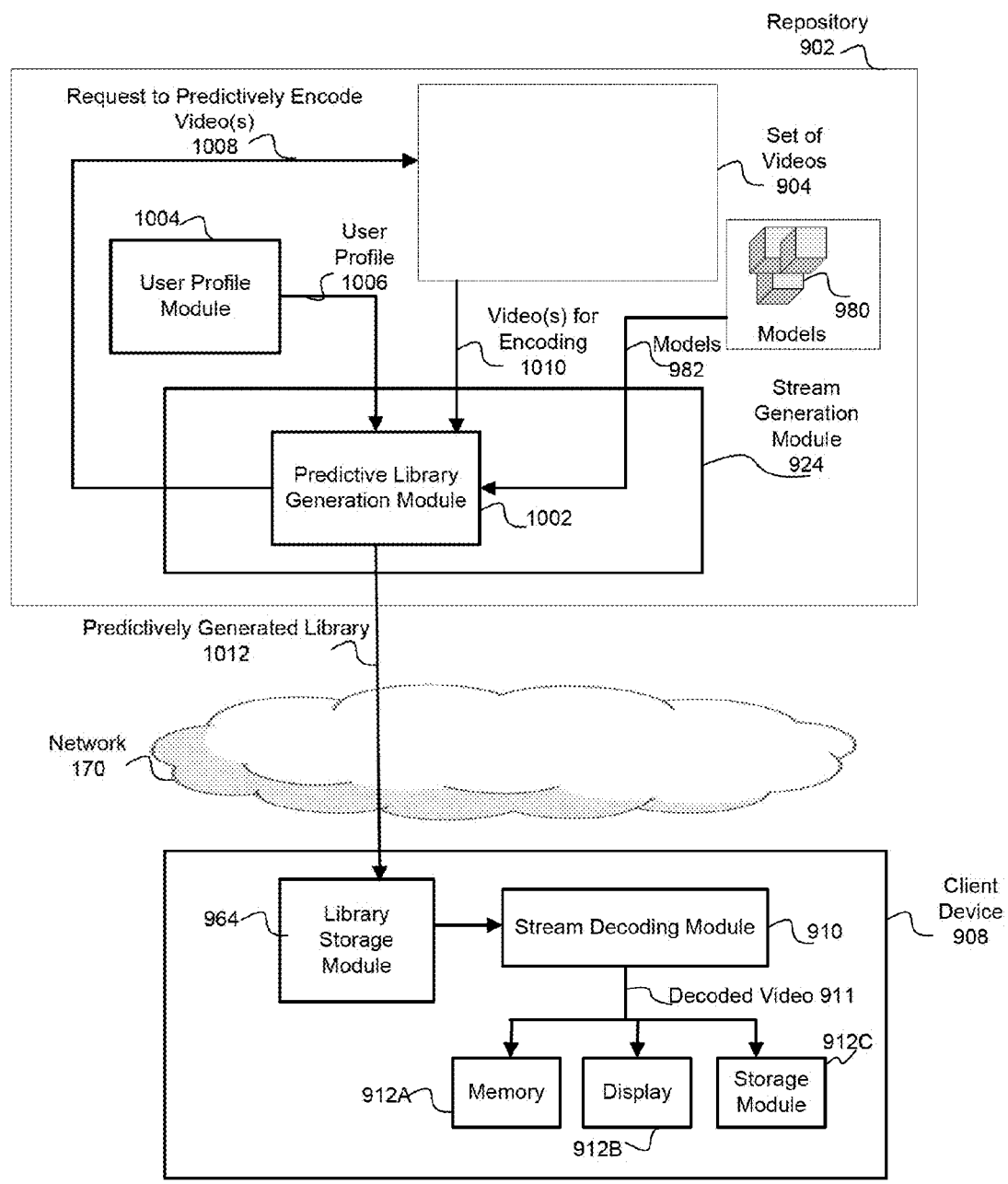
FIG. 10 is a block diagram illustrating an example embodiment of the repository operatively connected to the client device over the network.

FIG. 10 is a block diagram illustrating another example embodiment of the video repository 902 operatively connected to the client device 908 over a network 170. Predictively generating and distributing libraries can be advantageous to a user of the client device 908, for example, during peak usage periods of the network 170. For example, should the network experience high traffic, if the repository does not have to transmit a library because the library was previously generated and already transmitted to the client device 908, the network 170 may use less bandwidth during the high usage period.

The video repository 902 in FIG. 10 includes the stream generation module 924, which includes a predictive library generation module 1002. The predictive library generation module 1002 receives a user profile 1006 generated by a user profile module 1004. The user profile module 1004 stores user information, such as demographic information, geographic information, social networking information, or sport or sports team affiliations. The user profile module 1004 may also include individual preference data for the kinds of videos the user may watch. One person may like basketball, NASCAR, and Family Guy, while another enjoys Mad Men and reality TV. User preferences may be derived from video-on-demand (VOD) data such as listings of videos previously downloaded from the repository 902, from user subscriptions (such as a season pass), from user video queues, from user pre-release purchases, or from collaborative filtering of any combination of these data sources. User viewing preferences and behaviors can be used to refine the feature model libraries that are delivered to individual devices; further refinement can be achieved by combining user preference data with broadcast schedules.

The predictive library regeneration module 1002 generates a request to predictively encode videos 1008 based on the user profile 1006 in order to produce a model library 1012. For example, the predictive library generation module 1002 can predictively generate a library for a fan of a particular television show, as indicated in the user profile 1006.

Predicting the distribution and caching of the repository can improve video access, indexing, and archival. Anticipating demand scenarios can facilitate prediction of the distribution and caching of videos and libraries associated with the videos.

In one embodiment, a demand scenario can be based on a dependency, a predicted pre-delivery of a VOD, or a scheduled broadcast. The demand scenario can include: long tail VOD (i.e., requests for videos not commonly chosen), a recommendation system, a demographic profile, a broadcast schedule, a sport or sports team affiliation, a social network, a collaborative filter, a queue, a season pass, or a pre-release purchase. Each scenario has implications on the optimization of storage requirements and distribution of videos.

In one embodiment, the demand scenario is a long tail VOD scenario. Long tail VOD involves a user selecting a video (possibly an unpopular one) from a set of videos to be streamed to the user. The video selection process is balanced to allow equal access to any video data in the set. In the long tail VOD scenario, long tail VOD (videos that are not commonly chosen) can be encoded with high-demand video feature models, increasing the likelihood that the model data is available at the client device and making the residual video data easier to distribute (because, ideally, less residual video data remains after the higher-demand data has been distributed).

In another embodiment, the demand scenario is a recommendation system. Recommendation systems analyze an individual user's historical video preferences and drive the user to select video data to download that is likely to fit the user's historical video preferences. Feature models can be organized based on the user's historical video preferences, supporting the distribution scenarios. Feature models associated with anticipated user-demand can be pre-delivered to hedge against high network demand scenarios.

In another embodiment, the demand scenario is regional preferences (e.g., from demographic profile information). Traditional preferences can be derived from demographic profile information, so the repository can drive content to regional users. Content providers may assume resource costs to drive such content to the users.

In another embodiment, the demand scenario is a broadcast schedule. Models can be delivered by or derived based on broadcast schedules (e.g., a planned network schedule). A model can be created based on a recording from one channel and reused for the encoding of a program on another channel, or of another program on the same channel. The model can be derived from video data that is available from DVD, cable, etc. In one embodiment, transmission of the model may include enhancement information that increases the quality and/or resolution of the video data. The repository can provide a derived "quality" service that supplements existing broadcast models.

In another embodiment, the demand scenario is a sport or sports team affiliation. Models based on a user's sport/team affiliation can have video data consistency (e.g., faces of the same players, team logos and uniforms, a team's stadium, etc.) and can be geographically targeted for distribution. The models can be based on multi-view browsing, replays, high-temporal resolution, and real-time demands. Distribution of the models can be tiered.

In another embodiment, the demand scenario is social networking and/or collaborative filtering. A social network can anticipate demand by determining video demand of a user's peers/connections/friends. A collaborative filter can indirectly predict user demand based on peers. Models can be derived from the video that the user is predicted to watch based on the social network or collaborative filter.

In another embodiment, the demand scenario is a queue of videos. A queue can be a user defined prioritization of anticipated demand via a user selection of video data to be queued or time delayed/shifted. Models can be distributed based on optimizing model usage relative to the contents of the queue.

In another embodiment, the demand scenario is a season pass. As the monetization and exclusivity of the demanded content increases and is more directly related to the content itself, a model can be based on add-on extras where the add-on extra content is not disposable. In this demand scenario, a higher threshold exists for retaining distributed content and guaranteed delivery of content. Additionally, the distribution has a high degree of self-similarity in the data (e.g., same actors, sets, or graphics across a set of episodes) in the same way sports video data does.

In another embodiment, the demand scenario is pre-release purchasing. Pre-release purchasing includes pre-release video data, trailers, shorts, or sample "webisodes." Distribution of the video with a library of models can be based on delivered pre-released purchases.

Usage scenarios to determine organization of repository data can be predetermined or non-predetermined. Predetermined usage scenarios focus processing on general representations of the video data. Non-predetermined usage scenarios focus on specific representations of the video data.

In one embodiment, the set of videos 904 in FIG. 10 generates videos for encoding 1010 responsive to the request to predictively encode videos 1008, along with providing a hash-based index of associated videos models.

In another embodiment the predictive library generation module 1002 additionally obtains models 982 from a model library and uses that instead of the hash-based index. The predictive library generation module 1002 then produces a predictively generated library 1012. The predictively generated library 1012 is transmitted over the network 170 to the client device 908, which stores the predictively generated library 1012 in the library storage module 964. A person of ordinary skill in the art can recognize that the client device 908 stores the predictively generated library 1012 and employs the predictively generated library 1012 at a time when it receives an appropriate encoded video to decode. A person of ordinary skill in the art can also appreciate that other embodiments of the repository 902 on the client device 908 can be combined with the predictive library generation embodiment. For example, a library can be predictively generated and also transmitted differentially to the client device 908, as described in relation to FIG. 9B.

Embodiments of the present invention described above can be used with and without each other to form additional embodiments of the present invention.

Figure 11A:
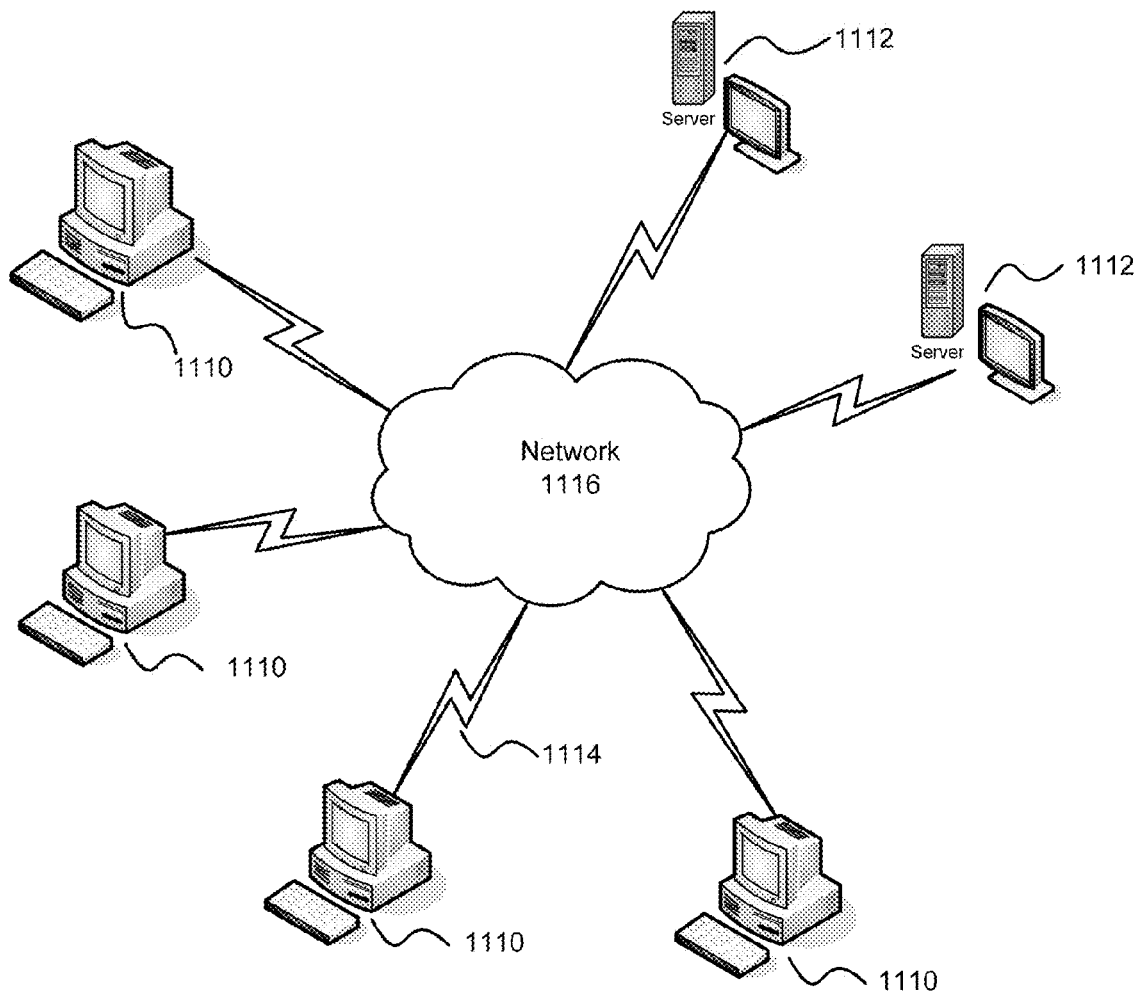
FIG. 11A is a schematic diagram of a computer network environment in which embodiments are deployed.
Figure 11B:
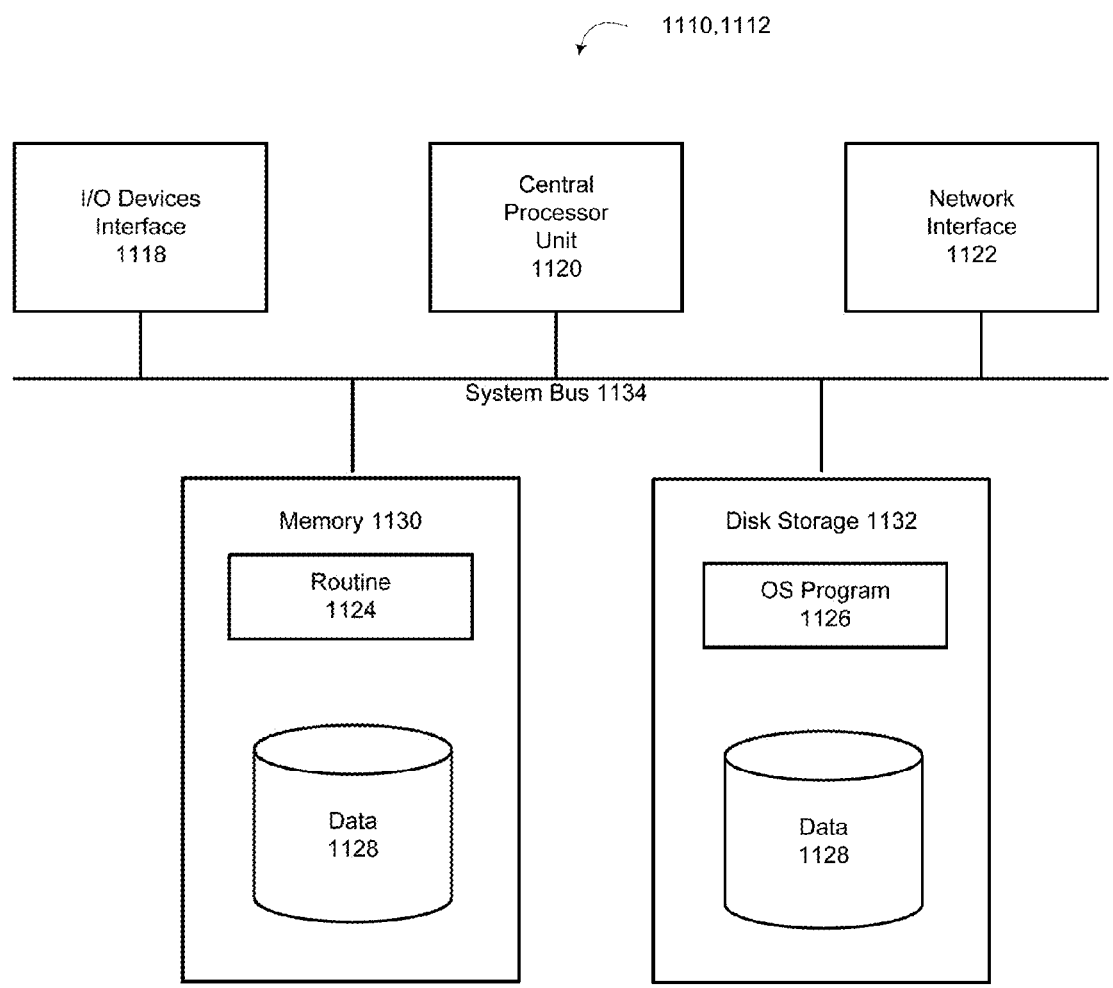
FIG. 11B is a block diagram of the computer nodes in the network of FIG. 11A.

While this invention has been particularly shown and described with references to example embodiments thereof, it will be understood by those skilled in the art that various changes in form and details may be made therein without departing from the scope of the invention encompassed by the appended claims. For example, although reference has been made herein to various system components, e.g. a codec, encoder, and decoder, it should be understood by those of ordinary skill that any other suitable hardware or software digital processing may be used to implement the video processing techniques described herein. For example, the present invention may be implemented in a variety of computer architectures. The computer network of FIGS. 11A and 11B are for purposes of illustration and not limitations of the present invention.

The invention can take the form of an entirely hardware embodiment, an entirely software embodiment or an embodiment containing both hardware and software elements. In one preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. A data processing system suitable for storing and/or executing program code will include at least one processor coupled directly or indirectly to memory elements through a system bus. The memory elements can include local memory employed during actual execution of the program code, bulk storage, and cache memories, which provide temporary storage of at least some program code in order to reduce the number of times codes are retrieved from bulk storage during execution.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

In an embodiment, FIG. 11A illustrates one such environment. Client computer(s)/devices 1110 and a cloud 1112 (or server computer or cluster thereof) provide processing, storage, and input/output devices executing application programs and the like. Client computer(s)/devices 1110 can also be linked through communications network 1116 to other computing devices, including other client devices/processes 1110 and server computer(s) 1112. Communications network 1116 can be part of a remote access network, a global network (e.g., the Internet), a worldwide collection of computers, Local area or Wide area networks, and gateways that currently use respective protocols (TCP/IP, Bluetooth, etc.) to communicate with one another. Other electronic device/computer network architectures are suitable.

FIG. 11B is a diagram of the internal structure of a computer/computing node (e.g., client processor/device 1110 or server computers 1112) in the processing environment of FIG. 11A. Each computer 1110, 1112 contains a system bus 1134, where a bus is a set of actual or virtual hardware lines used for data transfer among the components of a computer or processing system. Bus 1134 is essentially a shared conduit that connects different elements of a computer system (e.g., processor, disk storage, memory, input/output ports, etc.) that enables the transfer of information between the elements. Attached to system bus 1134 is an I/O device interface 1118 for connecting various input and output devices (e.g., keyboard, mouse, displays, printers, speakers, etc.) to the computer 1110, 1112. Network interface 1122 allows the computer to connect to various other devices attached to a network (for example the network illustrated at 1116 of FIG. 11A). Memory 1130 provides volatile storage for computer software instructions 1124 and data 1128 used to implement an embodiment of the present invention (e.g., codec, video encoder/decoder, feature models, model library and supporting code described throughout FIGS. 1-10). Disk storage 1132 provides non-volatile storage for computer software instructions 1124 (equivalently, "OS program" 1126) and data 1128 used to implement an embodiment of the present invention; it can also be used to store the models or to store the video in compressed format for long-term storage. Central processor unit 1120 is also attached to system bus 1134 and provides for the execution of computer instructions. Note that throughout the present text, "computer software instructions" and "OS program" are equivalent.

In one embodiment, the processor routines 1124 and data 1128 are a computer program product (generally referenced 1124), including a computer readable medium capable of being stored on a storage device 1128, which provides at least a portion of the software instructions for the invention system. The computer program product 1124 can be installed by any suitable software installation procedure, as is well known in the art. In another embodiment, at least a portion of the software instructions may also be downloaded over a cable, communication, and/or wireless connection. In other embodiments, the invention programs are a computer program propagated signal product 1114 (in FIG. 11A) embodied on a propagated signal on a propagation medium (e.g., a radio wave, an infrared wave, a laser wave, a sound wave, or an electrical wave propagated over a global network such as the Internet, or other network(s)). Such carrier media or signals provide at least a portion of the software instructions for the present invention routines/program 1124, 1126.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is transmitted over the propagation medium over a period of time, such as the instructions for a software application sent in packets over a network over a period of milliseconds, seconds, minutes, or longer. In another embodiment, the computer readable medium of computer program product 1124 is a propagation medium that the computer system 1110 may receive and read, such as by receiving the propagation medium and identifying a propagated signal embodied in the propagation medium, as described above for computer program propagated signal product.

It should be noted that although the figures described herein illustrate example data/execution paths and components, one skilled in the art would understand that the operation, arrangement, and flow of data to/from those respective components can vary depending on the implementation and the type of video data being compressed. Therefore, any arrangement of data modules/data paths can be used.

While this invention has been particularly shown and described with references to example embodiments thereof, it will be understood by those skilled in the art that various changes in form and details may be made therein without departing from the scope of the invention encompassed by the appended claims.

What is claimed is:

1. A method of providing video data, comprising:
encoding a subject video stream by a feature-based compression process that utilizes feature models from a global feature model library, said encoding implicitly using the feature models to indicate macroblocks in the subject video to encode and explicitly using pixels of the feature models to improve prediction of said macroblocks, resulting in an encoded video data, where the use of feature models to indicate macroblocks in the subject video avoids the need to segment features from non-features during the feature-based compression process of the subject video, and wherein the feature-based compression process applies feature-based prediction across multiple different video sources based on the feature models, the multiple different video sources being at least the subject video stream and one or more input videos used to generate the global feature model library; and
transmitting the encoded video data to a requesting device upon command, said feature models from the global feature model library being made accessible to the requesting device and enabling decoding of the encoded video data at the requesting device;
wherein the global feature model library is formed by:
receiving the one or more input videos, each input video being different from the subject video stream; and
for each of the input videos, generating feature information and a respective feature model.

2. The method as claimed in claim 1 wherein the global feature model library is further formed by storing in a data store or on cloud storage the feature models generated from the input videos, the data store or cloud storage providing pertinent feature models to the feature-based compression process and the requesting device.

3. The method as claimed in claim 1 wherein the global feature model library is further formed by:
for each input video, identifying and indexing features in the input video, the indexed features forming the respective feature model, said indexing including, for each identified feature, indicating location in the input video of the identified feature; and
wherein the decoding of the encoded video data at the requesting device uses the indexed features and corresponding feature locations in the input videos to obtain said feature models and decode the encoded video data.

4. The method as claimed in claim 3 wherein the indexing of features is a hash-based index.

5. The method as claimed in claim 1 wherein the feature models from the global feature model library form a working model subset library that is specialized per requesting device or per subject video stream.

6. The method as claimed in claim 1 wherein the feature models from the global feature model library form a working model subset library that is a differential library with respect to state of any libraries in the requesting device.

7. The method as claimed in claim 1 wherein the feature models from the global feature model library form a working model subset library that is a predictive model library storing feature models as a function of profile of an end user of the requesting device.

8. The method as claimed in claim 7 wherein the predictive model library has modifiable (settable) parameters enabling application to a variety of demand scenarios.

9. A video compression system comprising:
a model library storing video data and serving as a source of streaming video; and
a codec operatively coupled to the model library, and in response to a request for a subject video, the codec being executed by a processor to (i) encode stored video data in the model library corresponding to the requested certain subject video and to (ii) stream the encoded video data from the model library, wherein the codec applies feature-based prediction and compression using feature models from a global feature model library, wherein the global feature model library is formed by:
receiving one or more input videos, each input video being different from the stored video data in the model library corresponding to the requested certain video; and
for each of the input videos, generating feature information and a-respective feature models;
such that the codec applies feature-based compression, which includes implicitly using feature models to indicate which macroblocks in the subject video to encode and explicitly using the pixels of the feature models to improve prediction of said macroblocks, where association of the feature models from the global feature model library with macroblocks in the subject video avoids the need to segment features from non-features during the feature-based compression process of the subject video.

10. The video compression system as claimed in claim 9 wherein the codec:
encodes the stored video data in the model library by a feature-based compression that applies feature-based prediction based on the feature models, and
transmits the encoded video data to a requesting device, the encoded video data being the streamed video data from the model library.

11. The video compression system as claimed in claim 10 wherein the feature models from the global feature model library are made accessible to the requesting device and enable decoding of the encoded video data at the requesting device.

12. The video compression system as claimed in claim 10 wherein the global feature model library is further formed by:
for each input video, identifying and indexing features in the input video, the indexed features forming the respective feature model, said indexing including, for each identified feature, indicating location in the input video of the identified feature; and
wherein decoding of the encoded video data at the requesting device uses the indexed features and corresponding feature locations in the input videos to obtain said feature models and decode the encoded video data.

13. The video compression system as claimed in claim 12 wherein the indexing of features is a hash-based index.

14. The video compression system as claimed in claim 9 wherein the feature models are stored in the model library.

15. The video compression system as claimed in claim 9 wherein the feature models from the global feature model library form a working model subset library that is specialized per requesting device or per streamed encoded video data.

16. The video compression system as claimed in claim 9 wherein the feature models from the global feature model library form a working model subset library that is a differential library with respect to state of any libraries in a requesting device.

17. The video compression system as claimed in claim 9 wherein the feature models from the global feature model library form a working model subset library that is a predictive model library storing feature models as a function of profile of end-user.

18. The video compression system as claimed in claim 17 wherein the predictive model library has modifiable parameters enabling application to a variety of demand scenarios.

\* \* \* \* \*